United States Patent
Wei et al.

(10) Patent No.: US 8,615,035 B2
(45) Date of Patent: Dec. 24, 2013

(54) METHOD AND APPARATUS FOR BLOCK-WISE DECISION-FEEDBACK EQUALIZATION FOR WIRELESS COMMUNICATION

(75) Inventors: Yongbin Wei, San Diego, CA (US); Byoung-Hoon Kim, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 598 days.

(21) Appl. No.: 12/818,976

(22) Filed: Jun. 18, 2010

(65) Prior Publication Data

US 2011/0310952 A1   Dec. 22, 2011

Related U.S. Application Data

(63) Continuation of application No. 11/392,306, filed on Mar. 28, 2006, now Pat. No. 8,218,615.

(60) Provisional application No. 60/666,334, filed on Mar. 29, 2005, provisional application No. 60/666,416, filed on Mar. 29, 2005.

(51) Int. Cl.
*H03H 7/40* (2006.01)
*H04B 15/00* (2006.01)

(52) U.S. Cl.
USPC .................................. 375/233; 455/63.1

(58) Field of Classification Search
USPC .......... 375/233, 232, 346, 350; 370/208, 509; 455/63.1, 561, 562.1
See application file for complete search history.

(56) References Cited

U.S. PATENT DOCUMENTS

| 5,513,215 A | 4/1996 | Marchetto et al. |
| 5,930,296 A | 7/1999 | Kot |

(Continued)

FOREIGN PATENT DOCUMENTS

| JP | 05284063 | 10/1993 |
| JP | 10501387 | 2/1998 |

(Continued)

OTHER PUBLICATIONS

Benvenuto, et al.: "Block Iterative DFE for Single Carrier Modulation," Electronics Letters, vol. 38, No. 19, 2002. pp. 1-10.

(Continued)

*Primary Examiner* — Khai Tran
(74) *Attorney, Agent, or Firm* — Hossain Beladi

(57) ABSTRACT

Techniques for performing decision feedback equalization are described. A feed-forward filter response and a feedback filter response are derived based on a channel estimate and a reliability parameter and further without constraint on the feedback filter response or with a constraint of no feedback for an on-time sample. The reliability parameter is indicative of the reliability of the feedback used for equalization and may be frequency dependent or frequency invariant. Different feed-forward and feedback filter responses may be derived with different constraints on the feedback filter and different assumptions for the reliability parameter. Equalization is performed with the feed-forward and feedback filter responses. If equalization is performed for multiple iterations then, for each iteration, the reliability parameter may be updated, the feed-forward and feedback filter responses may be derived based on the updated reliability parameter, and equalization may be performed with the filter responses for the iteration.

36 Claims, 11 Drawing Sheets

(56) References Cited

U.S. PATENT DOCUMENTS

| | | | |
|---|---|---|---|
| 7,263,123 | B2 | 8/2007 | Yousef |
| 7,313,182 | B2 | 12/2007 | Fimoff et al. |
| 8,218,615 | B2 | 7/2012 | Wei et al. |
| 2002/0106040 | A1 | 8/2002 | Malkemes et al. |
| 2002/0186762 | A1 | 12/2002 | Xia et al. |
| 2003/0081669 | A1 | 5/2003 | Yousef et al. |
| 2004/0013190 | A1 | 1/2004 | Jayaraman et al. |
| 2005/0018794 | A1 | 1/2005 | Tang et al. |
| 2005/0232348 | A1 | 10/2005 | Chang |
| 2005/0259770 | A1 | 11/2005 | Chen |
| 2005/0286625 | A1 | 12/2005 | Jung |
| 2006/0270360 | A1* | 11/2006 | Han et al. .................. 455/69 |
| 2008/0317145 | A1 | 12/2008 | Clerckx et al. |

FOREIGN PATENT DOCUMENTS

| | | |
|---|---|---|
| JP | 11261457 | 9/1999 |
| JP | 2000068910 | 3/2000 |
| JP | 2000504166 | 4/2000 |
| JP | 2004512749 | 4/2000 |
| JP | 2000295145 A | 10/2000 |
| JP | 2002043991 | 2/2002 |
| JP | 2003217233 A | 7/2003 |
| JP | 2004135296 A | 4/2004 |
| JP | 2008536386 | 9/2008 |
| JP | 2010279315 A | 12/2010 |
| TW | I224451 | 11/2004 |
| TW | I229511 | 3/2005 |
| WO | WO9727695 | 7/1997 |
| WO | WO9727696 | 7/1997 |
| WO | WO0233964 A1 | 4/2002 |
| WO | WO2004010665 | 1/2004 |

OTHER PUBLICATIONS

Benvenuto, et al.: "On the Comparison Between OFDM and Single Carrier Modulation with a DFE Using a Frequency-Domain Feedforward Filter," IEEE Transactions on Communications, vol. 50, No. 6, Jun. 2002. pp. 947-955.

Chan, et al.: "A Class of Block-Iterative Equalizers for Intersymbol Interference Channels: Fixed Channel Results," IEEE Transactions on Communications, vol. 49, No. 11, Nov. 2001. pp. 1966-1976.

Cioffi, et al.: "MMSE Decision-Feedback Equalizers and Coding-Part I: Equalization Results," IEEE Transactions on Communications, vol. 43, No. 10, Oct. 1995. pp. 2582-2594.

Dinis, R.: "Iterative Block Decision-Feedback Equalization," CAPS-IST, Tech. Univ. of Lisbon, Portugal (http://www.sce.carleton.ca/bcws/oldsource/softlibrary/24Sep03.ppt).

International Search Report—PCT/US2006/011670, International Search Authority—European Patent Office—Aug. 14, 2006.

Kohno, et al.: "Automatic Equalizer Including a Decoder of Error-Correcting Code in Digital Transmission," Dept. of Electrical Engineering, University of Tokyo, pp. 1582-1586, XP-000794088.

Taiwan Search Report—App No. 095110941, Apr. 26, 2009.

Witschnig et al.: "Performance versus Effort for Decision Feedback Equalization—An Analysis based on SC/FDE adapted to IEEE 802.11 a," IEEE Communications Society, 2004 pp. 3455-3459.

Written Opinion—PCT/US2006/011670, International Search Authority—European Patent Office—Aug. 14, 2006.

European Search Report—EP10175637—Search Authority—Munich—Jan. 16, 2012.

* cited by examiner

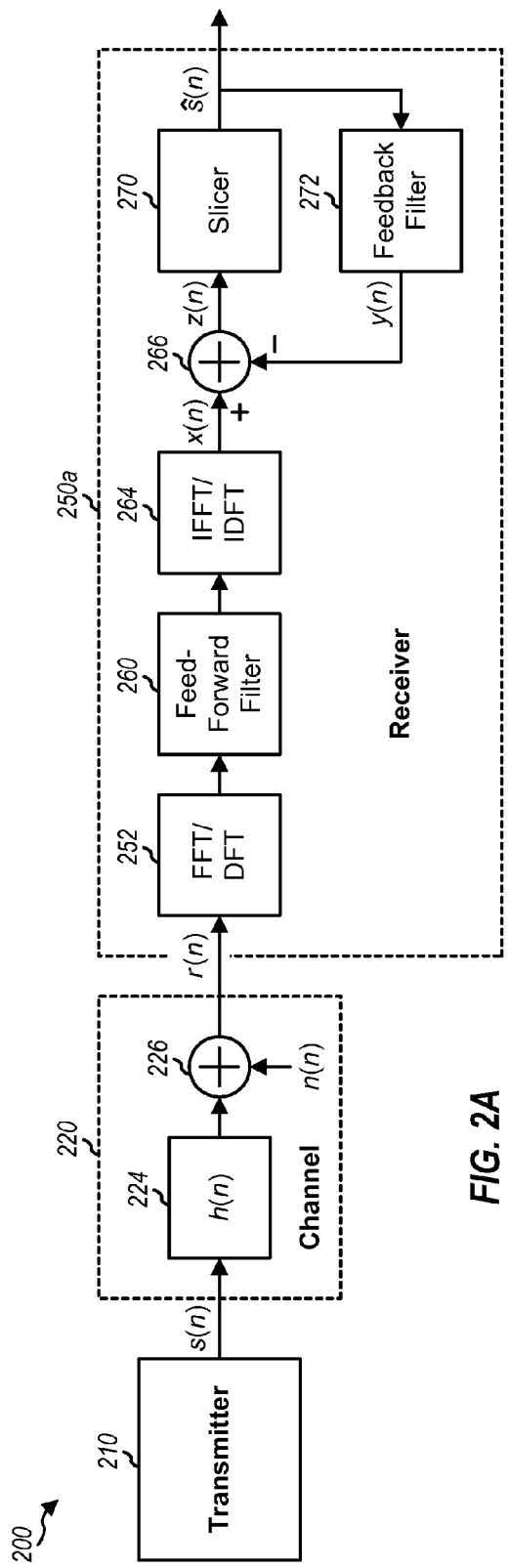
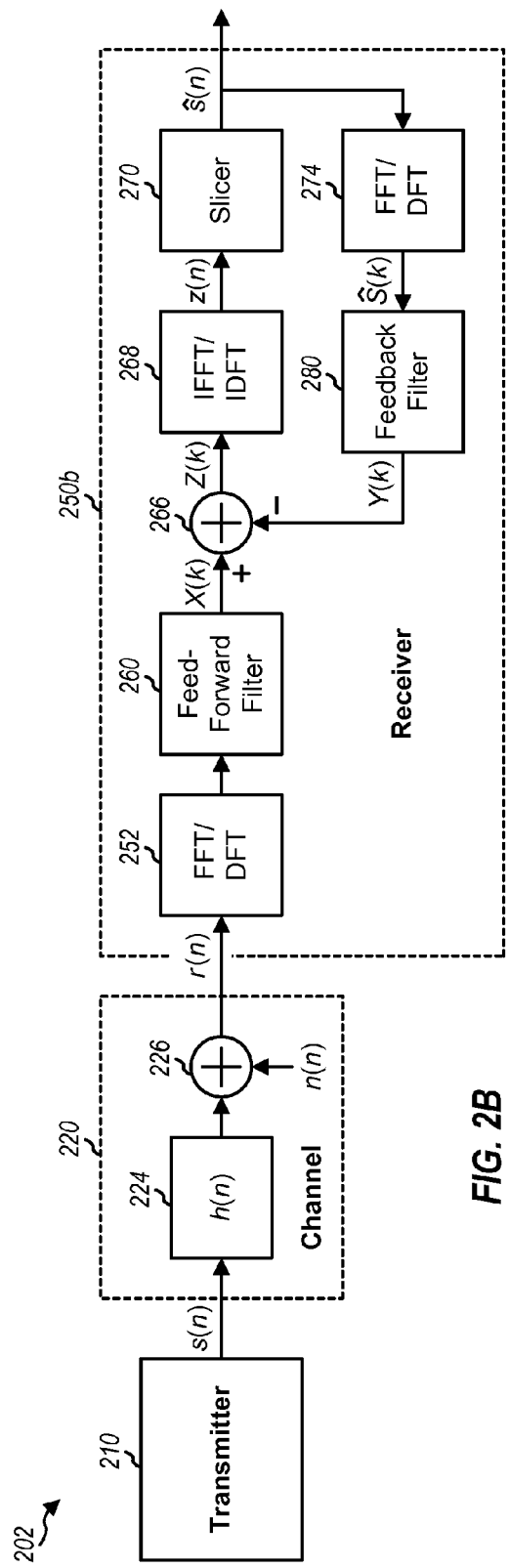
*FIG. 2A*
*FIG. 2B*

METHOD AND APPARATUS FOR BLOCK-WISE DECISION-FEEDBACK EQUALIZATION FOR WIRELESS COMMUNICATION

CLAIM OF PRIORITY UNDER 35 U.S.C. §119 AND 35 U.S.C. §120

The present Application for Patent is a continuation and claims priority to patent application Ser. No. 11/392,306 filed Mar. 28, 2006 and claims priority to Provisional Application Ser. No. 60/666,334, and Provisional Application Ser. No. 60/666,416, both filed Mar. 29, 2005, assigned to the assignee hereof, and expressly incorporated herein by reference.

BACKGROUND

1. Field

The present disclosure relates generally to communication, and more specifically to techniques for performing equalization in a communication system.

2. Background

In a communication system, a transmitter typically processes (e.g., encodes, interleaves, symbol maps, spreads, and scrambles) traffic data to generate a sequence of chips. The transmitter then processes the chip sequence to generate a radio frequency (RF) signal and transmits the RF signal via a communication channel. The communication channel distorts the RF signal with a channel response and further degrades the RF signal with noise and interference from other transmitters.

A receiver receives the transmitted RF signal and processes the received RF signal to obtain samples. The receiver may perform equalization on the samples to obtain estimates of the chips sent by the transmitter. The receiver then processes (e.g., descrambles, despreads, demodulates, deinterleaves, and decodes) the chip estimates to obtain decoded data. The equalization typically has a large impact on the quality of the chip estimates as well as the overall performance.

There is therefore a need in the art for techniques to perform equalization in a manner to achieve good performance.

SUMMARY

According to an embodiment of the invention, an apparatus is described which includes at least one processor and a memory. The processor(s) derive a feed-forward filter response and a feedback filter response based on a channel estimate and a reliability parameter and further without constraint on the feedback filter response or with a constraint of no feedback for an on-time sample. The reliability parameter is indicative of the reliability of the feedback used for equalization and may be frequency dependent or frequency invariant. The processor(s) perform equalization with the feed-forward and feedback filter responses.

According to another embodiment, a method is provided in which a feed-forward filter response and a feedback filter response are derived based on a channel estimate and a reliability parameter and further without constraint on the feedback filter response or with a constraint of no feedback for an on-time sample. Equalization is performed with the feed-forward and feedback filter responses.

According to yet another embodiment, an apparatus is described which includes means for deriving a feed-forward filter response and a feedback filter response based on a channel estimate and a reliability parameter and further without constraint on the feedback filter response or with a constraint of no feedback for an on-time sample. The apparatus further includes means for performing equalization with the feed-forward and feedback filter responses.

According to yet another embodiment, an apparatus is described which includes at least one processor and a memory. The processor(s) derive multiple feed-forward filter responses for multiple signal copies based on channel estimates for the multiple signal copies and a reliability parameter. The multiple signal copies may be obtained from oversampling and/or multiple receive antennas. The processor(s) also derive a feedback filter response based on the channel estimates and the reliability parameter. The processor(s) perform equalization on input symbols for the multiple signal copies with the multiple feed-forward filter responses and the feedback filter response.

According to yet another embodiment, a method is provided in which multiple feed-forward filter responses for multiple signal copies are derived based on channel estimates for the multiple signal copies and a reliability parameter. A feedback filter response is derived based on the channel estimates and the reliability parameter. Equalization is performed on input symbols for the multiple signal copies with the multiple feed-forward filter responses and the feedback filter response.

According to yet another embodiment, an apparatus is described which includes means for deriving multiple feed-forward filter responses for multiple signal copies based on channel estimates for the multiple signal copies and a reliability parameter, means for deriving a feedback filter response based on the channel estimates and the reliability parameter, and means for performing equalization on input symbols for the multiple signal copies with the multiple feed-forward filter responses and the feedback filter response.

According to yet another embodiment, an apparatus is described which includes at least one processor and a memory. The processor(s) estimate a reliability parameter based on a first data block that is decoded correctly, derive a feed-forward filter response and a feedback filter response based on a channel estimate and the reliability parameter, and perform equalization for a second data block with the feed-forward and feedback filter responses.

According to yet another embodiment, a method is provided in which a reliability parameter is estimated based on a first data block that is decoded correctly. A feed-forward filter response and a feedback filter response are derived based on a channel estimate and the reliability parameter. Equalization is performed for a second data block with the feed-forward and feedback filter responses.

According to yet another embodiment, an apparatus is described which includes means for estimating a reliability parameter based on a first data block that is decoded correctly, means for deriving a feed-forward filter response and a feedback filter response based on a channel estimate and the reliability parameter, and means for performing equalization for a second data block with the feed-forward and feedback filter responses.

Various aspects and embodiments of the invention are described in further detail below.

BRIEF DESCRIPTION OF THE DRAWINGS

FIG. 2A shows a chip-spaced DFE with a time-domain feedback filter.

FIG. 2B shows a chip-spaced DFE with a frequency-domain feedback filter.

DETAILED DESCRIPTION

The word "exemplary" is used herein to mean "serving as an example, instance, or illustration." Any embodiment described herein as "exemplary" is not necessarily to be construed as preferred or advantageous over other embodiments.

For clarity, the following nomenclature is used in much of the description below. Time-domain scalars are denoted by lower case text with index n for sample period, e.g., h(n). Frequency-domain scalars are denoted by upper case text with index k for frequency bin, e.g., H(k). Time-domain vectors are denoted by bolded lower case cursive text, e.g., $\boldsymbol{h}$. Time-domain matrices are denoted by bolded upper case cursive text, e.g., $\mathcal{H}$. Frequency-domain vectors are denoted by bolded lower case regular text, e.g., h. Frequency-domain matrices are denoted by bolded upper case regular text, e.g., H. The terms "chips" and "samples" generally refer to time-domain quantities, and the term "symbols" generally refers to frequency-domain quantities.

1. Chip-Spaced DFE

Figure 1A:
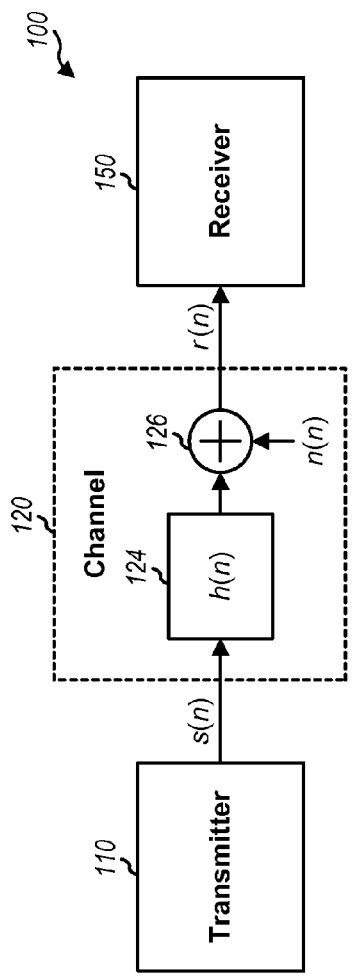
FIG. 1A shows a time-domain model of a communication channel.

FIG. 1A shows a time-domain model 100 of a communication system with a transmitter 110 and a receiver 150. Model 100 assumes that the received signal is sampled at chip rate so that the sample rate is equal to the chip rate. Transmitter 110 processes traffic data and generates transmit chips s(n), which are sent via a communication channel 120. Channel 120 is modeled with a time-domain impulse response of h(n) in block 124 and additive noise of n(n) via a summer 126. The channel impulse response h(n) includes the effects of the pulse shaping filter at transmitter 110, the propagation channel, the front-end filter at receiver 150, and so on. Receiver 150 obtains input samples r(n) via channel 120 and performs equalization on the input samples to obtain chip estimates ŝ(n), which are estimates of the transmit chips s(n).

Figure 1B:
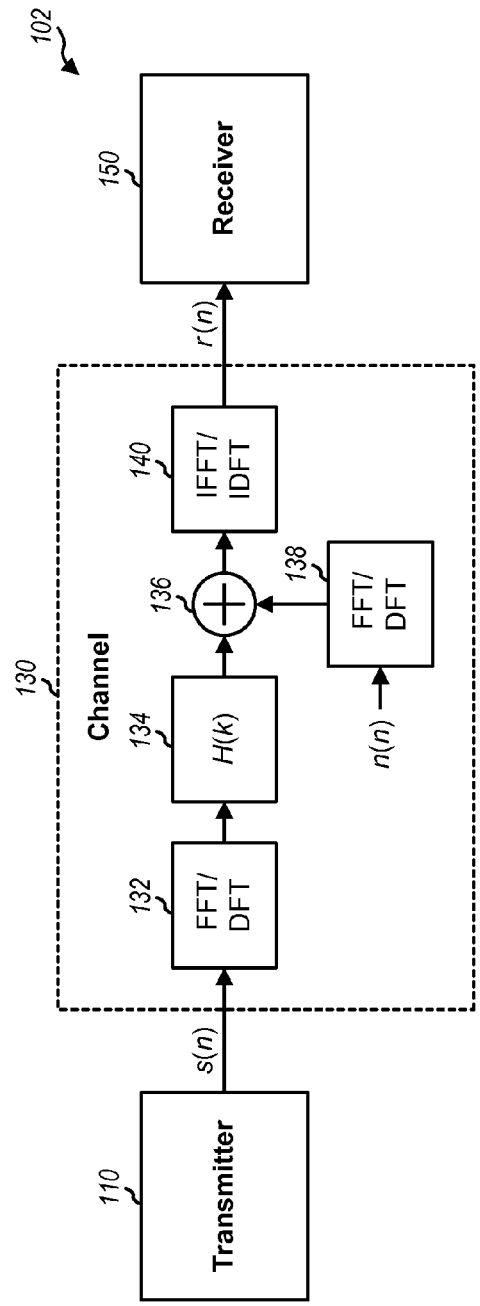
FIG. 1B shows a frequency-domain model of a communication channel.

FIG. 1B shows a frequency-domain model 102 of the communication system in FIG. 1A. Frequency-domain model 102 is equivalent to time-domain model 100. The transmit chips s(n) from transmitter 110 are sent via a communication channel 130. For channel 130, the time-domain transmit chips s(n) are transformed to the frequency domain with a K-point fast Fourier transform (FFT) or a K-point discrete Fourier transform (DFT) by a unit 132 to obtain frequency-domain transmit symbols S(k). Channel 130 is modeled with a channel frequency response of H(k) in block 134 and additive noise of N(k) via a summer 136. A unit 138 performs a K-point FFT/DFT on the time-domain noise n(n) and provides the frequency-domain noise N(k). A unit 140 performs a K-point inverse FFT (IFFT) or a K-point inverse DFT (IDFT) on the frequency-domain input symbols R(k) from summer 136 and provides the time-domain input samples r(n) to receiver 150.

The time-domain input samples r(n) and the frequency-domain input symbols R(k) may be expressed as:

$$r(n) = h(n) \otimes s(n) + n(n), \text{ and} \quad \text{Eq (1)}$$

$$R(k) = H(k) \cdot S(k) + N(k), \quad \text{Eq (2)}$$

where $\otimes$ denotes a convolution.

Receiver 150 may process the input samples on a block-by-block basis. A data block may also be called a packet, a frame, and so on. In an embodiment, each data block contains K input samples. The input samples and input symbols may be expressed in matrix form for one data block, as follows:

$$\underline{s} = \underline{W}_K \cdot \underline{s}, \quad \text{Eq (3)}$$

$$\underline{r} = \underline{H} \cdot \underline{s} + \underline{n}, \text{ and} \quad \text{Eq (4)}$$

$$\underline{r} = \underline{W}_K^{-1} \cdot \underline{r} \quad \text{Eq (5)}$$

where
s = [s(1) s(2) ... s(K)]$^T$ is a K×1 vector of transmit chips,
$\bar{s}$ = [S(1) S(2) ... S(K)]$^T$ is a K×1 vector of transmit symbols,
r = [R(1) R(2) ... R(K)]$^T$ is a K×1 vector of received symbols,
r = [r(1) r(2) ... r(K)]$^T$ is a K×1 vector of received samples,
$\bar{n}$ = [N(1) N(2) ... N(K)]$^T$ is a K×1 vector of noise,
H is a K×K channel response matrix containing channel gains H(1) through H(K) along the diagonal and zeros elsewhere,
$W_K$ is a K×K Fourier matrix,
$W_K^{-1}$ is a K×K inverse Fourier matrix, and
"T" denotes a transpose.

The noise may be assumed to be additive white Gaussian noise (AWGN) with zero mean and a covariance matrix of $N_t \cdot \underline{I}$, where $N_t$ is the variance of the noise and $\underline{I}$ is the identity matrix.

The element in row k and column n of $\underline{W}_K$ may be given as:

$$W(k,n) = e^{-j2\pi \cdot (k-1)(n-1)/K}. \quad \text{Eq (6)}$$

In equation (6), the "−1" is due to indices k and n starting with 1 instead of 0.

Receiver 150 may perform decision feedback equalization on each block of input samples. A decision feedback equalizer (DFE) typically includes a feed-forward filter and a feedback filter. In an embodiment, the feed-forward filter is implemented in the frequency domain, and the feedback filter may be implemented in either the time domain or the frequency domain.

FIG. 2A shows a block diagram of a model 200 with a DFE having a time-domain feedback filter. A transmitter 210 generates transmit chips s(n), which are sent via a communication channel 220. Channel 220 is modeled with a channel impulse response of h(n) in block 224 and additive noise of n(n) via a summer 226. A receiver 250a obtains input samples r(n) via channel 220. Within receiver 250a, an FFT/DFT unit 252 transforms the input samples to the frequency domain and provides input symbols R(k). A feed-forward filter 260 filters the input symbols and provides filtered symbols X(k). An IFFT/IDFT unit 264 transforms the filtered symbols to the time domain and provides filtered samples x(n). A summer 266 subtracts feedback samples y(n) from the filtered samples x(n) and provides equalized samples z(n). A slicer 270 slices or quantizes the equalized samples z(n) and provides chip estimates ŝ(n). A feedback filter 272 filters the chip estimates and provides the feedback samples y(n).

FIG. 2B shows a block diagram of a model 202 with a DFE having a frequency-domain feedback filter. Transmitter 210 and communication channel 220 are as described above for FIG. 2A. A receiver 250b obtains input samples r(n) via channel 220. Within receiver 250b, FFT/DFT unit 252 and feed-forward filter 260 operate on the input samples as described above for FIG. 2A and provide filtered symbols X(k). Summer 266 subtracts feedback symbols Y(k) from the filtered symbols X(k) and provides equalized symbols Z(k). An IFFT/IDFT unit 268 transforms the equalized symbols to the time domain and provides equalized samples z(n). Slicer 270 slices the equalized samples z(n) and provides chip estimates ŝ(n). An FFT/DFT unit 274 transforms the chip estimates ŝ(n) to the frequency domain and provides symbol estimates Ŝ(k). A feedback filter 280 filters the symbol estimates and provides the feedback symbols Y(k).

If a transmitted block has either a cyclic prefix or zero padding, then a linear convolution of the input samples and the impulse response of a time-domain feed-forward filter is equivalent to a cyclic convolution. In this case, the time-domain feed-forward filter may be represented in the frequency domain by a block-wise feed-forward filter having a frequency response denoted by a K×K diagonal matrix F. Matrix F contains K filter coefficients along the diagonal for the K frequency bins and zeros elsewhere.

A time-domain feedback filter may have an impulse response denoted by an L×1 vector $\underline{b} = [b_0 \ b_1 \ b_2 \ldots b_{L-1}]^T$. If the transmitted block has either a cyclic prefix or zero padding, then the feedback samples may be expressed as:

$$\underline{y} = \underline{\mathcal{B}} \cdot \underline{\hat{s}}, \qquad \text{Eq (7)}$$

where
$\underline{\hat{s}} = [\hat{s}(1) \ \hat{s}(2) \ldots \hat{s}(K)]^T$ is a K×1 vector of chip estimates,
$\underline{y} = [y(1) \ y(2) \ldots y(K)]^T$ is a K×1 vector of feedback samples, and $$\underline{\mathcal{B}} = \begin{bmatrix} b_0 & 0 & \ldots & 0 & b_{L-1} & \ldots & b_2 & b_1 \\ b_1 & b_0 & \ldots & 0 & 0 & b_{L-1} & \ldots & b_2 \\ \vdots & \vdots & \vdots & \vdots & \vdots & \vdots & \vdots & \vdots \\ 0 & \ldots & 0 & b_{L-1} & \ldots & b_2 & b_1 & b_0 \end{bmatrix}$$

is a K×K circular matrix.
The circular matrix $\underline{\mathcal{B}}$ contains elements of the impulse response vector $\underline{b}$.

The time-domain feedback filter may be represented in the frequency domain by a block-wise feedback filter having a frequency response denoted by a K×K diagonal matrix B. Matrix B contains K filter coefficients along the diagonal for the K frequency bins and zeros elsewhere. Since $\underline{\mathcal{B}}$ is a circular matrix, $\underline{\mathcal{B}}$ may be diagonalized as follows:

$$\underline{\mathcal{B}} = \underline{W}_K^{-1} \cdot B \cdot \underline{W}_K. \qquad \text{Eq (8)}$$

Figure 3:
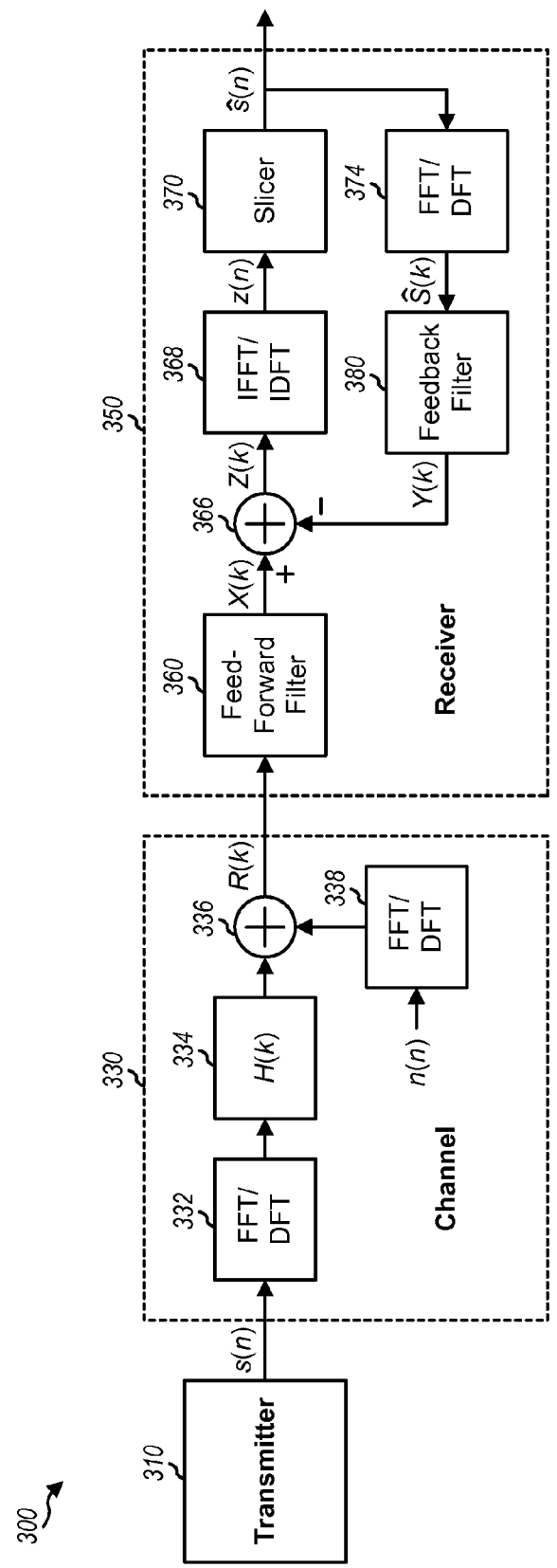
FIG. 3 shows a frequency-domain model for a chip-space DFE.

FIG. 3 shows a frequency-domain model 300 with a chip-space DFE. Model 300 is equivalent to model 200 in FIG. 2A and model 202 in FIG. 2B. A transmitter 310 generates time-domain transmit chips s(n), which are sent via a communication channel 330. Channel 330 is modeled with an FFT/DFT unit 332 that transforms the transmit chips to transmit symbols S(k), a block 334 for the channel frequency response H(k), an FFT/DFT unit 338 that transforms time-domain noise n(n) to frequency-domain noise N(k), and a summer 336 that sums the outputs of blocks 334 and 338 and provides input symbols R(k) to a receiver 350.

Within receiver 350, a feed-forward filter 360 filters the input symbols R(k) and provides filtered symbols X(k). A summer 366 subtracts feedback symbols Y(k) from the filtered symbols X(k) and provides equalized symbols Z(k). An IFFT/IDFT unit 368 transforms the equalized symbols Z(k) to the time domain and provides equalized samples z(n). A slicer 370 slices the equalized samples z(n) and provides chip estimates ŝ(n). An FFT/DFT unit 374 transforms the chip estimates to the frequency domain and provides symbol estimates Ŝ(k). A feedback filter 380 filters the symbol estimates and provides the feedback symbols Y(k).

The filtered symbols from feed-forward filter 360 may be expressed as:

$$\begin{aligned} \underline{x} &= \underline{F} \cdot \underline{r}, \\ &= \underline{F} \cdot \underline{H} \cdot \underline{W}_K \cdot \underline{s} + \underline{F} \cdot \underline{W}_K \cdot \underline{n}, \end{aligned} \qquad \text{Eq (9)}$$

where $\underline{x} = [X(1) \ X(2) \ldots X(K)]^T$ is a K×1 vector of filtered symbols.

The feedback symbols from feedback filter 380 may be expressed as:

$$\underline{y} = \underline{B} \cdot \underline{W}_K \cdot \underline{\hat{s}}, \qquad \text{Eq (10)}$$

where $\underline{y} = [Y(1) \ Y(2) \ldots Y(K)]^T$ is a K×1 vector of feedback symbols.

The equalized samples provided to slicer 370 may be expressed as:

$$\begin{aligned} \underline{z} &= \underline{W}_K^{-1} \cdot (\underline{x} - \underline{y}), \\ &= \underline{W}_K^{-1} \cdot (\underline{F} \cdot \underline{H} \cdot \underline{W}_K \cdot \underline{s} - \underline{B} \cdot \underline{W}_K \cdot \underline{\hat{s}}) + \underline{W}_K^{-1} \cdot \underline{F} \cdot \underline{W}_K \cdot \underline{n}, \end{aligned} \qquad \text{Eq (11)}$$

where $\underline{z} = [z(1) \ z(2) \ldots z(K)]^T$ is a K×1 vector of equalized samples.

The feed-forward filter frequency response F and the feedback filter frequency response B may be derived in various manners. In an embodiment, the filter responses F and B are derived based on a minimum mean square error (MMSE) criterion that minimizes the mean square error (MSE) between the transmit chips s and the equalized samples z. The MSE may be expressed as:

$$\begin{aligned} MSE &= E\{(\underline{z} - \underline{s})^H \cdot (\underline{z} - \underline{s})\}, \\ &= \text{Trace}(E\{(\underline{z} - \underline{s}) \cdot (\underline{z} - \underline{s})^H\}). \end{aligned} \qquad \text{Eq (12)}$$

The following assumptions may be made:

$$E\{\underline{s} \cdot \underline{s}^H\} = E\{\underline{\hat{s}} \cdot \underline{\hat{s}}^H\} = E_s \cdot \underline{I}, \text{ and} \qquad \text{Eq (13)}$$

$$E\{\underline{s} \cdot \underline{\hat{s}}^H\} = E\{\underline{W}_K \cdot \underline{s} \cdot \underline{s}^H \cdot \underline{W}_K\} = E_s \cdot \underline{R}, \qquad \text{Eq (14)}$$

where
$E_s$ is the energy-per-chip for the transmit chips s(n),
$E\{\ \}$ denotes an expectation operation,
$\underline{\hat{s}} = [\hat{S}(1) \ \hat{S}(2) \ldots \hat{S}(K)]^T$ is a K×1 vector of symbol estimates,
R is a K×K feedback correlation matrix, and
"$^H$" denotes a conjugate transpose.

Equation (13) indicates that the transmit chips s as well as the chip estimates ŝ are uncorrelated. Equation (14) describes the correlation between the transmit chips s and the chip estimates ŝ. This correlation is related to the reliability of the decision feedback for the DFE.

Equation (12) may be expanded and combined with equations (11), (13) and (14). The MSE may then be expressed as:

$$MSE = E_s \cdot \sum_{k=1}^{K} |F(k) \cdot H(k) - 1|^2 + N_t \cdot \sum_{k=1}^{K} |F(k)|^2 - \quad \text{Eq (15)}$$

$$E_s \cdot \sum_{k=1}^{K} [F(k) \cdot H(k) - 1] \cdot B^*(k) \cdot R(k,k) -$$

$$E_s \cdot \sum_{k=1}^{K} [F(k) \cdot H(k) - 1]^* \cdot B(k) \cdot R^*(k,k) + E_s \cdot \sum_{k=1}^{K} |B(k)|^2,$$

where F(k), B(k) and R(k,k) are the k-th diagonal elements of K×K matrices F, B, and R, respectively. F(k) is the feed-forward filter coefficient for frequency bin k, B(k) is the feedback filter coefficient for bin k, and R(k,k) is a reliability value for bin k.

In an embodiment, the feed-forward and feedback filter responses are derived without any constraint on the feedback filter. For this embodiment, the feedback filter impulse response may be given by L×1 vector $\underline{b} = [b_0 \ b_1 \ b_2 \ldots b_{L-1}]^T$. Vector $\underline{b}$ contains L time-domain filter taps $b_0$ through $b_{L-1}$.

From equation (15), the feed-forward filter response may be given as:

$$F(k) = \frac{E_s \cdot (1 - |R(k,k)|^2) \cdot H^*(k)}{E_s \cdot (1 - |R(k,k)|^2) \cdot |H(k)|^2 + N_t}, \quad \text{Eq (16)}$$

for $k = 1, \ldots, K$.

The feedback filter response may be given as:

$$B(k) = \frac{-N_t \cdot R(k,k)}{E_s \cdot (1 - |R(k,k)|^2) \cdot |H(k)|^2 + N_t}, \quad \text{Eq (17)}$$

for $k = 1, \ldots, K$.

In equations (16) and (17), R(k,k) is indicative of the reliability of the feedback from the slicer.

In another embodiment, the feed-forward and feedback filter responses are derived with a constraint of $b_0=0$ for the feedback filter. The feedback filter is typically used to compensate only for intersymbol interference and hence there is no feedback related to the on-time sample. Coefficient $b_0$ determines the feedback for the on-time sample and may be set to zero. For this embodiment, the feedback filter impulse response may be given by an L×1 vector $\underline{b} = [0 \ b_1 \ b_2 \ b_{L-1}]^T$.

The feedback filter response may be given as:

$$\underline{b} = \underline{Q}^{-1} \cdot \underline{p}, \text{ and} \quad \text{Eq (18)}$$

$$B(k) = \sum_{l=1}^{L-1} b_l \cdot e^{-j2\pi \cdot (k-1) \cdot l/L}, \text{ for } k = 1, \ldots, K, \quad \text{Eq (19)}$$

where $\underline{Q}$ is an (L−1)×(L−1) matrix and $\underline{p}$ is an (L−1)×1 vector.

The elements of $\underline{Q}$ may be given as:

$$Q(m,l) = \sum_{k=1}^{K} \left( \frac{|R(k,k)|^2}{E_s \cdot |H(k)|^2 + N_t} + 1 - |R(k,k)|^2 \right) \cdot e^{j2\pi \cdot (k-1)(m-l)/K}, \quad \text{Eq (20)}$$

where Q(m,l), for m,l=1, . . . , (L−1), is the element in row m and column l of Q.

The elements of $\underline{p}$ may be given as:

$$p(m) = -\sum_{k=1}^{K} \frac{R(k,k)}{E_s \cdot |H(k)|^2 + N_t} \cdot e^{j2\pi \cdot (k-1)m/K}, \quad \text{Eq (21)}$$

where p(m), for m=1, (L−1), is the m-th element of $\underline{p}$.

Vector $\underline{b}$ may be derived based on matrix $\underline{Q}$ and vector $\underline{p}$, as shown in equation (18).

Vector $\underline{b}$ may then be transformed with an FFT/DFT to obtain the feedback filter response B(k), as shown in equation (19). To reduce computation, L may be selected to be much less than K but large enough to cover significant ISI components.

From equation (15) and with the constraint of $b_0=0$, the feed-forward filter response may be given as:

$$F(k) = \frac{E_s \cdot [1 + B(k) \cdot R^*(k,k)] \cdot H^*(k)}{E_s \cdot |H(k)|^2 + N_t}, \text{ for } k = 1, \ldots, K. \quad \text{Eq (22)}$$

Equation (22) indicates that the feed-forward filter response F(k) is dependent on the feedback filter response B(k) for the embodiment with $b_0=0$.

In yet another embodiment, the feed-forward and feedback filter responses are derived with a constraint of $b_0=0$ for the feedback filter and with R(k,k)=ρ and L=K. ρ is a reliability factor for the feedback and is not dependent on frequency.

For this embodiment, the feed-forward filter response may be given as:

$$F(k) = \frac{E_s \cdot H^*(k) \cdot G_F}{E_s \cdot |H(k)|^2 \cdot (1 - \rho^2) + N_t}, \text{ for } k = 1, \ldots, K, \quad \text{Eq (23)}$$

where $$G_F = \frac{1}{1 + \frac{E_s \cdot \rho^2}{K} \cdot \sum_{i=1}^{K} \frac{|H(i)|^2}{E_s \cdot |H(i)|^2 \cdot (1 - \rho^2) + N_t}}$$

is not dependent on frequency.

The feedback filter response may be given as:

$$B(k) = \left( F(k) \cdot H(k) - \frac{1}{K} \cdot \sum_{i=1}^{K} F(i) \cdot H(i) \right) \cdot \rho, \quad \text{Eq (24)}$$

$$= [F(k) \cdot H(k) - G_B] \cdot \rho,$$

for $k = 1, \ldots, K,$ where $$G_B = \frac{1}{K} \cdot \sum_{i=1}^{K} F(i) \cdot H(i)$$

is also not dependent on frequency.

Equation (24) indicates that the feedback filter response B(k) is dependent on the feed-forward filter response F(k) for the embodiment with $b_0=0$, $R(k,k)=\rho$, and $L=K$.

In yet another embodiment, the feed-forward and feedback filter responses are derived with a constraint of $b_0=0$ for the feedback filter and with an assumption of no feedback errors so that $\hat{s}(n)=s(n)$ and $R(k,k)=1$. For this embodiment, the feedback filter response may be given as shown in equations (18) and (19), where $$Q(m, l) = \sum_{k=1}^{K} \frac{e^{j2\pi \cdot (k-1)(m-l)/K}}{E_s \cdot |H(k)|^2 + N_t}, \quad \text{Eq (25)}$$

for $m, l = 1, \ldots, (L-1)$, and $$p(m) = -\sum_{k=1}^{K} \frac{e^{j2\pi \cdot (k-1)m/K}}{E_s \cdot |H(k)|^2 + N_t}, \quad \text{Eq (26)}$$

for $m = 1, \ldots, (L-1)$.

The feed-forward filter response may be given as:

$$F(k) = \frac{E_s \cdot [1 + B(k)] \cdot H^*(k)}{E_s \cdot |H(k)|^2 + N_t}, \text{ for } k = 1, \ldots, K. \quad \text{Eq (27)}$$

Figure 4:
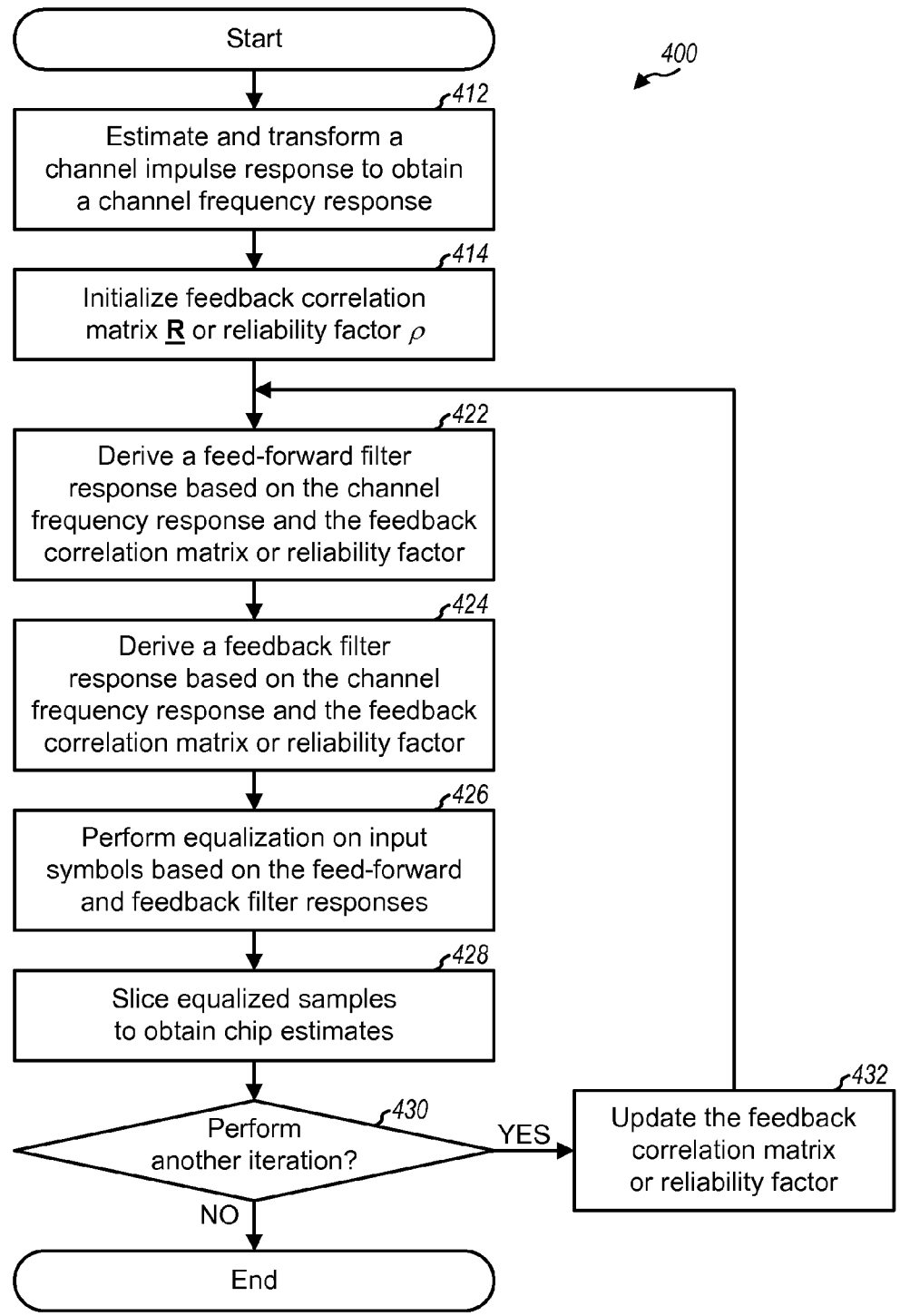
FIG. 4 shows a process to derive feed-forward and feedback filter responses.

FIG. 4 shows an embodiment of a process 400 for deriving the feed-forward and feedback filter responses and equalizing the input symbols. Initially, a channel impulse response h(n) is estimated and transformed with an FFT/DFT to obtain a channel frequency response H(k) (block 412). A feedback correlation matrix R or a reliability factor ρ is initialized, e.g., to zero for the first iteration (block 414). For some embodiments described above, matrix R may be equal to ρ·I, in which case R(k,k)=ρ, or may be equal to I, in which case R(k,k)=1.

A feed-forward filter response F(k) is derived based on the channel frequency response H(k) and the feedback correlation R(k,k) or the reliability factor ρ (block 422). A feedback filter response B(k) is also derived based on the channel frequency response H(k) and the feedback correlation R(k,k) or the reliability factor ρ (block 424). The feed-forward and feedback filter responses may be derived without any constraint on the feedback filter, e.g., as shown in equations (16) and (17). The feed-forward and feedback filter responses may also be derived with a constraint of $b_0=0$ for the feedback filter, e.g., as shown in equations (18) through (22), or equations (23) and (24) for the case with R(k,k)=ρ and L=K, or equations (25) through (27) for the case with R(k,k)=1. The chip estimates are not available for the first iteration. Hence, the derivation of the feedback filter response may be omitted for the first iteration.

For some embodiments described above, matrix Q and vector p may be derived based on the channel frequency response H(k) and the feedback correlation R(k,k) or the reliability factor ρ, e.g., as shown in equations (20) and (21) or equations (25) and (26).

The feedback filter response may then be derived based on matrix Q and vector p, e.g., as shown in equations (18) and (19).

In some embodiments, the feed-forward filter response and the feedback filter response may be derived independently of one another. In some other embodiments, the feed-forward filter response may be derived first, and the feedback filter response may be derived with the feed-forward filter response, e.g., as shown in equation (24). In yet some other embodiments, the feedback filter response may be derived first, and the feed-forward filter response may be derived with the feed-forward filter response e.g., as shown in equation (22) or (27).

Equalization is performed on the input symbols R(k) based on the feed-forward and feedback filter responses, e.g., as shown in equations (9) through (11) (block 426). The equalized symbols are transformed and sliced to obtain chip estimates $\hat{s}(n)$ (block 428).

Equalization may be performed for one or multiple iterations. Each iteration may also be called a stage, a round, and so on. A determination is made whether to perform another iteration (block 430). If the answer is 'Yes', then the feedback correlation matrix R or the reliability factor ρ is updated as described below (block 432). Matrix R or reliability factor ρ should become larger for each iteration. The process then returns to block 422 to update the feed-forward and feedback filter responses and to perform equalization with the updated filter responses. Otherwise, if all iterations are completed and the answer is 'No' for block 430, then the process terminates.

Figure 5:
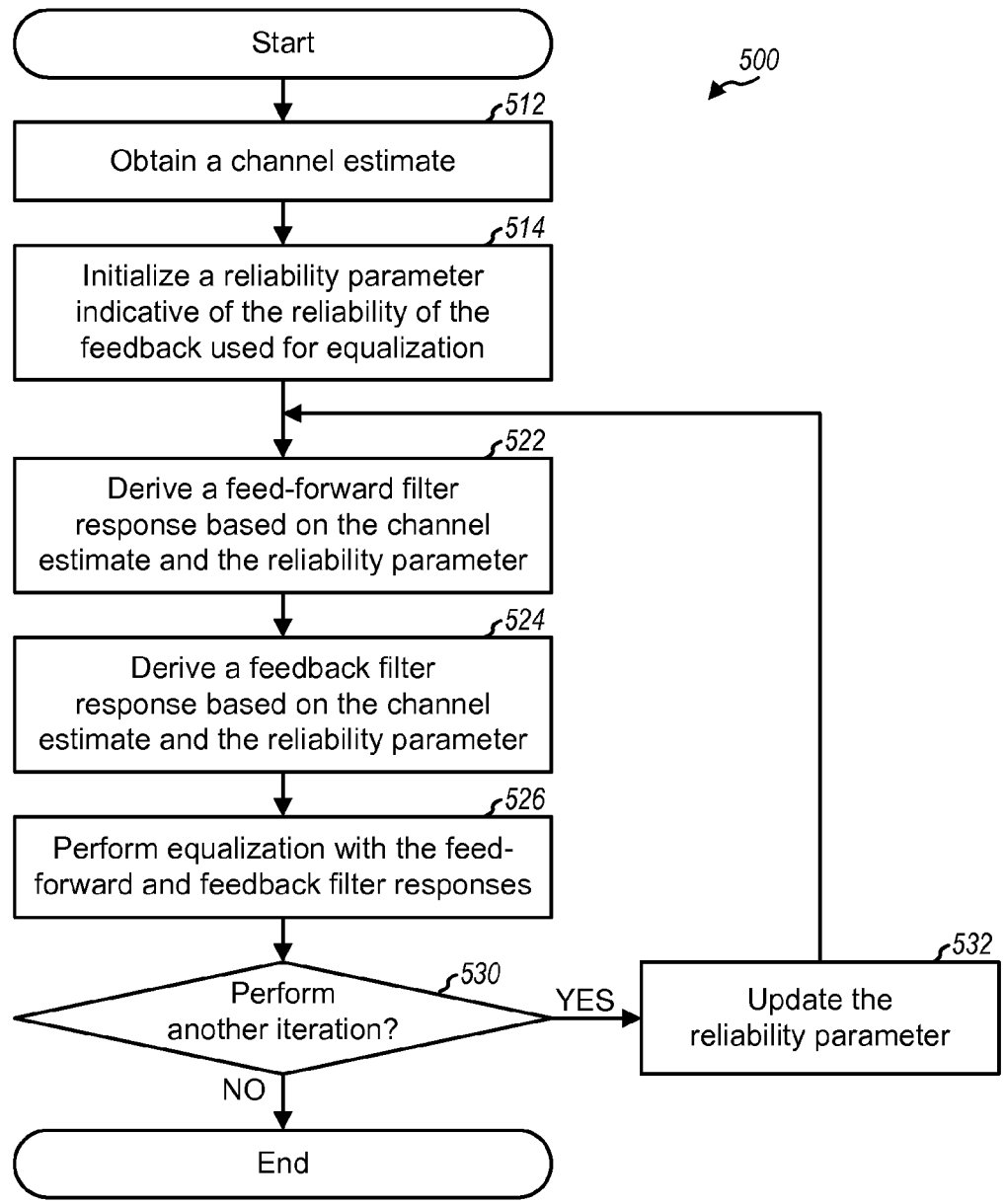
FIG. 5 shows a process to perform decision feedback equalization.

FIG. 5 shows an embodiment of a process 500 for performing decision feedback equalization. A channel estimate is obtained for a communication channel (block 512). The channel estimate may be a channel impulse response estimate, a channel frequency response estimate, and so on. A reliability parameter indicative of the reliability of the feedback used for equalization is initialized (block 514). The reliability parameter may be a feedback correlation matrix R, a reliability factor ρ, and/or some other quantity. The reliability parameter may be a function of frequency or may be frequency invariant.

A feed-forward filter response is derived based on the channel estimate and the reliability parameter (block 522). A feedback filter response is derived based on the channel estimate and the reliability parameter (block 524). The feed-forward and feedback filter responses may be derived (1) without any constraint on the feedback filter, (2) with a constraint of no feedback for an on-time sample, or (3) based on some other constraint or condition. The feed-forward and feedback filter responses may be derived based on MMSE or some other criterion. The feed-forward and feedback filter responses may be derived independently of one another, the feedback filter response may be derived based on the feed-forward filter response, or the feed-forward filter response may be derived based on the feedback filter response. The feed-forward filter response may be in the frequency domain and comprise frequency-domain coefficients. The feedback filter response may be in (1) the frequency domain and comprise frequency-domain coefficients or (2) the time domain and comprise time-domain taps. In general, different feed-forward and feedback filter responses may be derived for different filter constraints, assumptions on feedback reliability, design criteria, and so on.

Equalization is performed with the feed-forward and feedback filter responses (block 526). The equalization may be performed on a block-by-block basis for each received data block. Equalization may also be performed for multiple iterations. If another iteration is to be performed, as determined in block 530, then the reliability parameter may be updated, and the feed-forward and feedback filter responses for the next iteration may be derived based on the channel estimate and the updated reliability parameter.

2. Fractionally-Spaced DFE

Figure 6A:
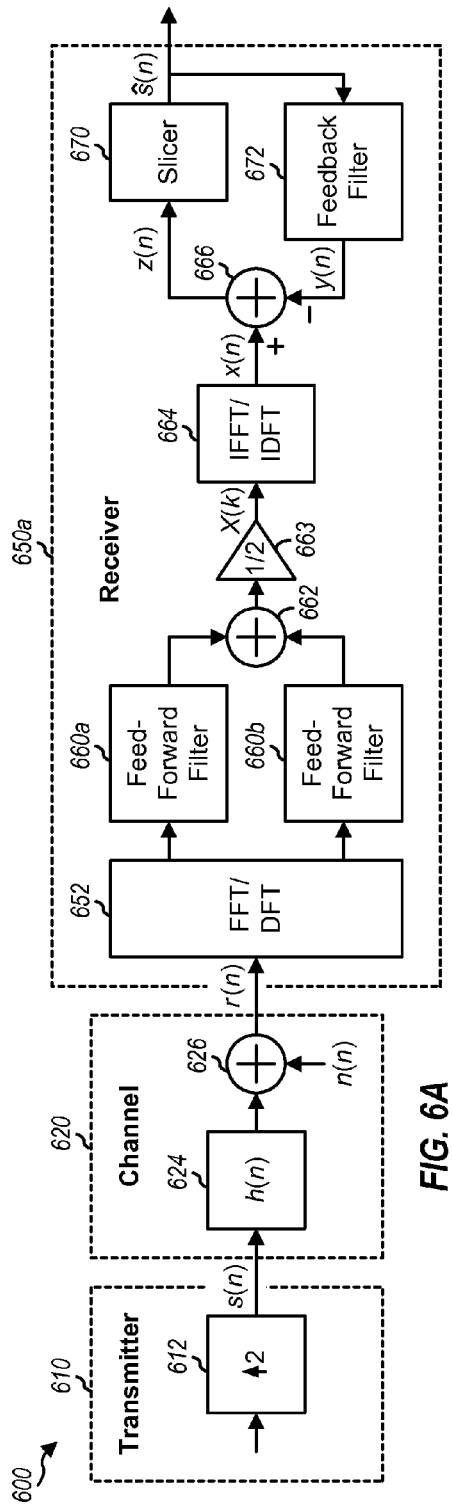
FIG. 6A shows a fractionally-spaced DFE with a time-domain feedback filter.

FIG. 6A shows a time-domain model 600 for a communication system with two times (2×) over-sampling at a receiver 650a. A transmitter 610 processes traffic data and generates transmit chips s(n') at the chip rate, where n' is an index for chip period. In an actual system, transmitter 610 sends the transmit chips via a communication channel 620 to receiver 650a. For model 600, an upsampler 612 inserts a zero after each transmit chip and provides output samples s(n) at the sample rate. Channel 620 is modeled with a channel impulse response of h(n) in block 624 and additive noise of n(n) via a summer 626.

FIG. 6A also shows a fractionally-spaced DFE with a time-domain feedback filter. The term "fractionally-spaced" refers to sampling at a higher rate than the chip rate, and it is usually higher than the rate required by Nyquist sampling theorem. Receiver 650a digitalizes the received signal at twice the chip rate and obtains input samples r(n) at a sample rate that is twice the chip rate. A unit 652 transforms the input samples to the frequency domain with a 2K-point FFT/DFT and provides input symbols R(k), for k=1, ..., 2K. The 2× over-sampling of the received signal results in two copies of the signal spectrum being available. The two redundant signal copies are referred to as a lower copy (L) and an upper copy (U). The first K input symbols R(k), for k=1, ..., K, are for the lower copy, are denoted as $R_L(k)$, for k=1, ..., K, and are provided to a feed-forward filter 660a. The last K input symbols R(k), for k=K+1, ..., 2K, are for the upper copy, are denoted as $R_U(k)$, for k=1, ..., K, and are provided to a feed-forward filter 660b.

Feed-forward filter 660a filters the input symbols $R_L(k)$ and provides filtered symbols $X_L(k)$ for the lower copy. Feed-forward filter 660b filters the input symbols $R_U(k)$ and provides filtered symbols $X_U(k)$ for the upper copy. A summer 662 sums the filtered symbols $X_L(k)$ and $X_U(k)$ on a bin-by-bin basis. A gain element 663 scales the output of summer 662 with a gain of ½ and provides filtered symbols X(k), for k=1, ..., K. A unit 664 performs a K-point IFFT/IDFT on the filtered symbols and provides filtered samples x(n) at the chip rate. The summing of $X_L(k)$ and $X_U(k)$ by summer 662, scaling by ½ with unit 663, and K-point IFFT/IDFT by unit 664 is equivalent to performing a 2K-point IFFT/IDFT on $X_L(k)$ and $X_U(k)$ followed by decimation by a factor of two to obtain the filtered samples x(n) at the chip rate. A summer 666 subtracts feedback samples y(n) from the filtered samples x(n) and provides equalized samples z(n). A slicer 670 slices the equalized samples z(n) and provides chip estimates ŝ(n). A feedback filter 672 filters the chip estimates and provides the feedback samples y(n).

Figure 6B:
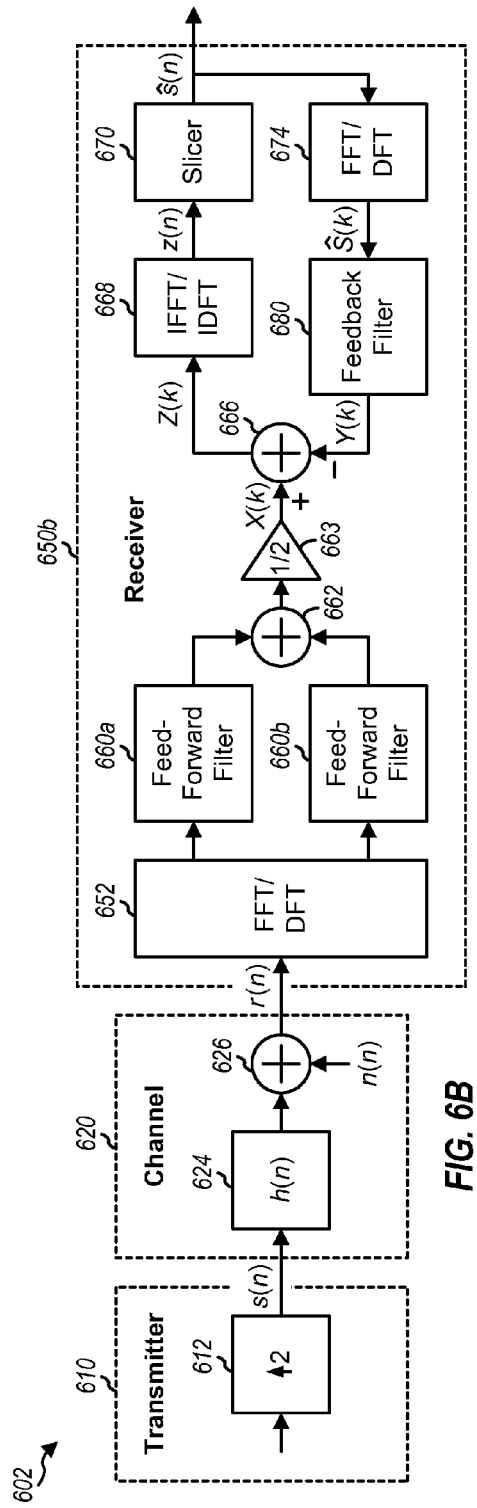
FIG. 6B shows a fractionally-spaced DFE with a frequency-domain feedback filter.

FIG. 6B shows a block diagram of a model 602 with a fractionally-spaced DFE having a frequency-domain feedback filter. Transmitter 610 and channel 620 are as described above for FIG. 6A. A receiver 650b obtains input samples r(n) at the sample rate. Within receiver 650b, FFT/DFT unit 652, feed-forward filters 660a and 660b, summer 662, and gain element 663 operate on the input samples as described above for FIG. 6A and provide filtered symbols X(k). Summer 666 subtracts feedback symbols Y(k) from the filtered symbols X(k) and provides equalized symbols Z(k). An IFFT/IDFT unit 668 transforms the equalized symbols to the time domain and provides equalized samples z(n). Slicer 670 slices the equalized samples z(n) and provides chip estimates ŝ(n). An FFT/DFT unit 674 transforms the chip estimates to the frequency domain and provides symbol estimates Ŝ(k). A feedback filter 680 filters the symbol estimates and provides the feedback symbols Y(k).

Figure 7:
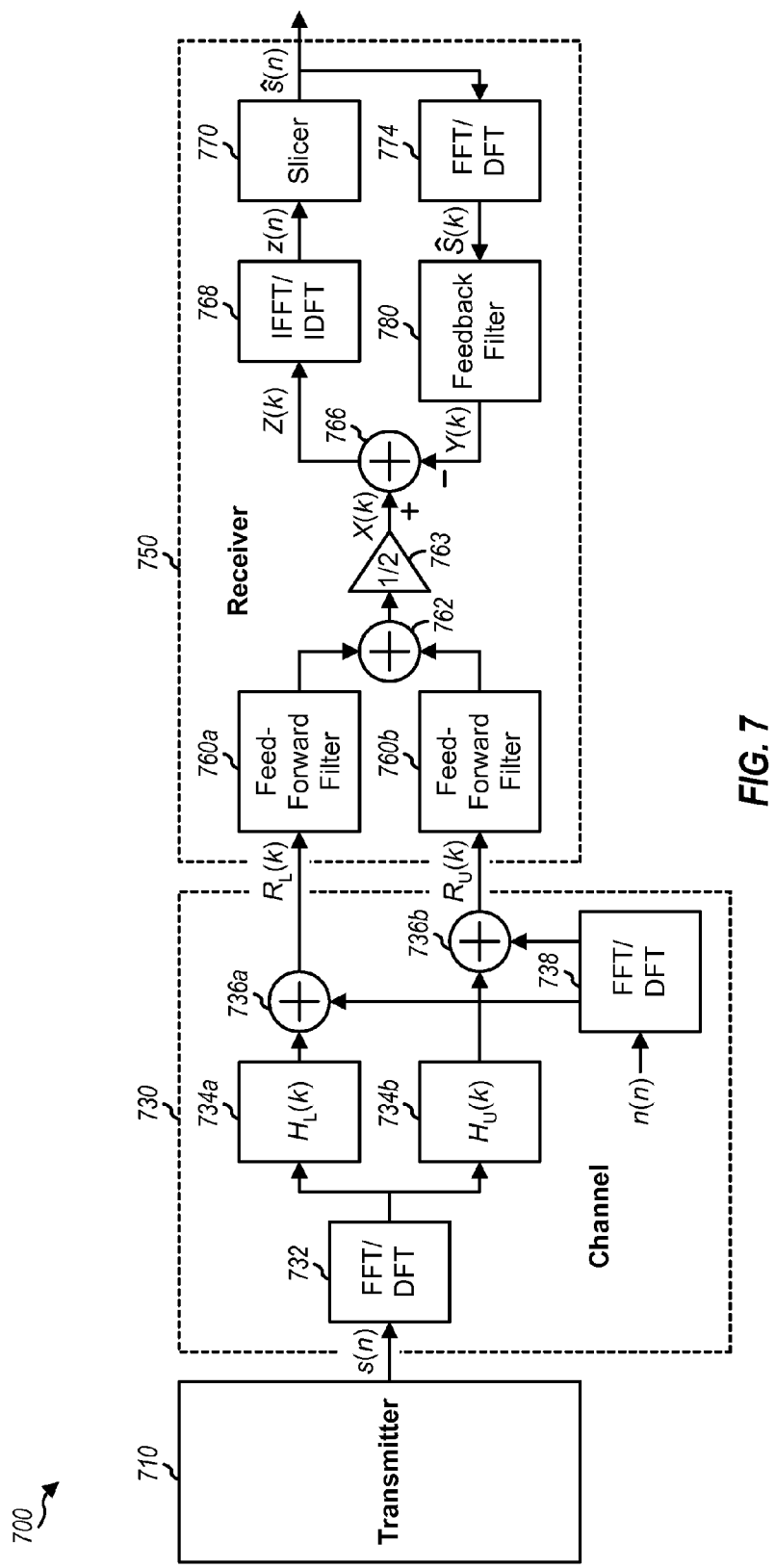
FIG. 7 shows a frequency-domain model for a fractionally-spaced DFE.

FIG. 7 shows a frequency-domain model 700 with a fractionally-spaced DFE. Model 700 is equivalent to model 600 in FIG. 6A and model 602 in FIG. 6B. A transmitter 710 generates time-domain transmit chips s(n') at the chip rate, which are sent via a communication channel 730. For channel 730, the time-domain transmit chips are transformed to the frequency domain with a K-point FFT/DFT by a unit 732 to obtain frequency-domain transmit symbols S(k), for k=1, ..., K. The channel for the lower signal copy is modeled by a frequency response of $H_L(k)$ in block 734a and additive noise of $N_L(k)$ via a summer 736a. The channel for the upper signal copy is modeled by a frequency response of $H_U(k)$ in block 734b and additive noise of $N_U(k)$ via a summer 736b. A unit 738 transforms the time-domain noise n(n) and provides the frequency-domain noise $N_L(k)$ and $N_U(k)$ for the lower and upper copies, respectively.

A receiver 750 obtains input symbols $R_L(k)$ and $R_U(k)$ for the lower and upper copies, respectively. Feed-forward filters 760a and 760b filter the input symbols $R_L(k)$ and $R_U(k)$ and provide filtered symbols $X_L(k)$ and $X_U(k)$, respectively. The filtered symbols $X_L(k)$ and $X_U(k)$ are summed by a summer 762 and scaled with a gain of ½ by a gain element 763 to obtain filtered symbols X(k). A summer 766 subtracts feedback symbols Y(k) from the filtered symbols X(k) and provides equalized symbols Z(k). The equalized symbols Z(k) are transformed to the time domain by an IFFT/IDFT unit 768 and sliced by a slicer 770 to obtain chip estimates ŝ(n). The chip estimates are transformed to the frequency domain by an FFT/DFT unit 774 and filtered by a feedback filter 780 to obtain the feedback symbols.

The input symbols may be expressed in matrix form for one data block, as follows:

$$\underline{r}_L = \underline{H}_L \cdot \underline{s} + \underline{n}_L, \text{ and}$$

$$\underline{r}_U = \underline{H}_U \cdot \underline{s} + \underline{n}_U, \quad \text{Eq (28)}$$

where $\underline{H}_L$ is a K×K diagonal channel response matrix for the lower copy, $\underline{H}_U$ is a K×K diagonal channel response matrix for the upper copy, $\underline{r}_L$ is a K×1 vector of received symbols for the lower copy, $\underline{r}_U$ is a K×1 vector of received symbols for the upper copy, and $\underline{n}_L$ and $\underline{n}_U$ are K×1 noise vectors for the lower and upper copies, respectively.

The filtered symbols from feed-forward filters 760a and 760b may be expressed as:

$$\underline{x}_L = \underline{F}_L \cdot \underline{r}_L, \text{ and}$$

$$\underline{x}_U = \underline{F}_U \cdot \underline{r}_U, \quad \text{Eq (29)}$$

where $\underline{F}_L$ and $\underline{F}_U$ are K×K diagonal matrices for the feed-forward filter responses for the lower and upper copies, respectively, and $\underline{x}_L$ and $\underline{x}_U$ are K×1 filtered symbol vectors for the lower and upper copies.

The feedback symbols $\underline{y}$ from feedback filter 780 may be expressed as:

$$\underline{y} = \underline{B} \cdot \underline{W}_K \cdot \hat{\underline{s}}. \quad \text{Eq (30)}$$

The equalized samples $\underline{z}$ provided to slicer 770 may be expressed as:

$$\underline{z} = \underline{W}_K^{-1} \cdot [0.5 \cdot (\underline{x}_L + \underline{x}_U) - \underline{y}], \quad \text{Eq (31)}$$

$$= \underline{W}_K^{-1} \cdot [0.5 \cdot (\underline{E}_L \cdot \underline{H}_L + \underline{E}_U \cdot \underline{H}_U) \cdot \underline{W}_K \cdot \underline{s} - \underline{B} \cdot \underline{W}_k \cdot \underline{\hat{s}})] +$$

$$0.5 \cdot \underline{W}_K^{-1} \cdot [\underline{E}_L \ \underline{E}_U] \cdot \underline{W}_{2K} \cdot \underline{n}_{2K},$$

where $\underline{W}_{2K}$ is a 2K×2K Fourier matrix and $\underline{n}_{2K}$ is a 2K×1 noise vector. All other matrices in equation (31) are K×K matrices, and all other vectors are K×1 vectors.

The feed-forward filter frequency responses $\underline{F}_L$ and $\underline{F}_U$ and the feedback filter frequency response $\underline{B}$ may be derived based on an MMSE criterion that minimizes the MSE shown in equation (12) with the assumptions shown in equations (13) and (14). Equation (12) may be expanded and combined with equations (13), (14) and (31). The MSE may then be expressed as:

$$MSE = E_s \cdot \sum_{k=1}^{K} |0.5[F_L(k) \cdot H_L(k) + F_U(k) \cdot H_U(k)] - 1|^2 + \quad \text{Eq (32)}$$

$$0.5 N_t \cdot \sum_{k=1}^{K} |F_L(k)|^2 + |F_U(k)|^2 - E_s \cdot$$

$$\sum_{k=1}^{K} \{0.5[F_L(k) \cdot H_L(k) + F_U(k) \cdot H_U(k)] - 1\} \cdot B^*(k) \cdot R(k,k) -$$

$$E_s \cdot \sum_{k=1}^{K} \{0.5[F_L(k) \cdot H_L(k) + F_U(k) \cdot H_U(k)] - 1\}^* \cdot$$

$$B(k) \cdot R^*(k,k) + E_s \cdot \sum_{k=1}^{K} |B(k)|^2,$$

where $F_L(k)$, $F_U(k)$, $H_L(k)$, $H_U(k)$ are the k-th diagonal elements of K×K matrices $\underline{F}_L$, $\underline{F}_U$, $\underline{H}_L$ and $\underline{H}_U$, respectively.

In an embodiment, the feed-forward and feedback filter responses are derived without any constraint on the feedback filter. For this embodiment, the feedback filter impulse response may be given by L×1 vector $\underline{b} = [b_0 \ b_2 \ldots b_{L-1}]^T$.

From equation (32), the feed-forward filter response may be given as:

$$F_c(k) = \frac{2E_s \cdot (1 - |R(k,k)|^2) \cdot H_c^*(k)}{E_s \cdot (1 - |R(k,k)|^2) \cdot (|H_L(k)|^2 + |H_U(k)|^2) + 2N_t}, \quad \text{Eq (33)}$$

for $k = 1, \ldots, K$, where $H_c(k)$, for c=L, U, is the channel gain for frequency bin k in copy c, and
$F_c(k)$, for c=L, U, is the feed-forward filter coefficient for bin k in copy c.

The feedback filter response may be given as:

$$B(k) = \frac{-2N_t \cdot R(k,k)}{E_s \cdot (1 - |R(k,k)|^2) \cdot (|H_L(k)|^2 + |H_U(k)|^2) + 2N_t}, \quad \text{Eq (34)}$$

for $k = 1, \ldots, K$.

In another embodiment, the feed-forward and feedback filter responses are derived with a constraint of $b_0=0$ for the feedback filter. For this embodiment, the feedback filter impulse response may be given by L×1 vector $\underline{b} = [0 \ b_1 \ b_2 \ldots b_{L-1}]^T$. To reduce computation, L may be selected to be much less than K but large enough to cover significant ISI components.

The feedback filter response may be given as shown in equations (18) and (19), where the elements of matrix $\underline{Q}$, for m,l=1, ..., (L−1), may be given as:

$$Q(m,l) = \sum_{k=1}^{K} \left( \frac{2N_t \cdot |R(k,k)|^2}{E_s \cdot (|H_L(k)|^2 + |H_U(k)|^2) + 2N_t} + 1 - |R(k,k)|^2 \right) \cdot \quad \text{Eq (35)}$$

$$e^{j2\pi \cdot (k-1)(m-l)/K}.$$

The elements of vector $\underline{p}$, for m=1, ..., (L−1), may be given as:

$$p(m) = -\sum_{k=1}^{K} \frac{2N_t \cdot R(k,k)}{E_s \cdot (|H_L(k)|^2 + |H_U(k)|^2) + 2N_t} \cdot e^{j2\pi \cdot (k-1)m/K}. \quad \text{Eq (36)}$$

From equation (32) and with the constraint of $b_0=0$, the feed-forward filter responses may be given as:

$$F_c(k) = \frac{2E_s \cdot [1 + B(k) \cdot R^*(k,k)] \cdot H_c^*(k)}{E_s \cdot (|H_L(k)|^2 + |H_U(k)|^2) + 2N_t}, \quad \text{Eq (37)}$$

for $k = 1, \ldots, K$.

In yet another embodiment, the feed-forward and feedback filter responses are derived with a constraint of $b_0=0$ for the feedback filter and with R(k,k)=ρ and L=K. For this embodiment, the feed-forward filter response may be given as:

$$F_c(k) = \frac{2E_s \cdot H_c^*(k) \cdot G_{F2}}{E_s \cdot (|H_L(k)|^2 + |H_U(k)|^2) \cdot (1 - \rho^2) + 2N_t}, \quad \text{Eq (38)}$$

for $k = 1, \ldots, K$, where $$G_{F2} = \frac{1}{1 + \frac{E_s \cdot \rho^2}{K} \cdot \sum_{i=1}^{K} \frac{(|H_L(i)|^2 + |H_U(i)|^2)}{E_s \cdot (|H_L(i)|^2 + |H_U(i)|^2) \cdot (1 - \rho^2) + 2N_t}}.$$

The feedback filter response may be given as:

$$B(k) = \{0.5[F_L(k) \cdot H_L(k) + F_U(k) \cdot H_U(k)] - G_{B2}\} \cdot \rho, \quad \text{Eq (39)}$$

for $k = 1, \ldots, K$, where $$G_{B2} = \frac{1}{2K} \cdot \sum_{i=1}^{K} [F_L(i) \cdot H_L(i) + F_U(i) \cdot H_U(i)].$$

In yet another embodiment, the feed-forward and feedback filter responses are derived with a constraint of $b_0=0$ for the feedback filter and with an assumption of no feedback errors so that $\hat{s}(n)=s(n)$ and R(k,k)=1. For this embodiment, the feedback filter response may be given as shown in equations (18) and (19), where $$Q(m, l) = \sum_{k=1}^{K} \frac{e^{j2\pi \cdot (k-1)(m-l)/k}}{E_s \cdot (|H_L(k)|^2 + |H_U(k)|^2) + 2N_t}, \quad \text{Eq (40)}$$

for $m, l = 1, \ldots, (L-1)$, and $$p(m) = -\sum_{k=1}^{K} \frac{e^{j2\pi \cdot (k-1)m/K}}{E_s \cdot (|H_L(k)|^2 + |H_U(k)|^2) + 2N_t}, \quad \text{Eq (41)}$$

for $m = 1, \ldots, (L-1)$.

The feed-forward filter responses may be given as:

$$F_c(k) = \frac{2E_s \cdot [1 + B(k)] \cdot H_c^*(k)}{E_s \cdot (|H_L(k)|^2 + |H_U(k)|^2) + 2N_t}, \quad \text{Eq (42)}$$

for $k = 1, \ldots, K$.

Figure 8:
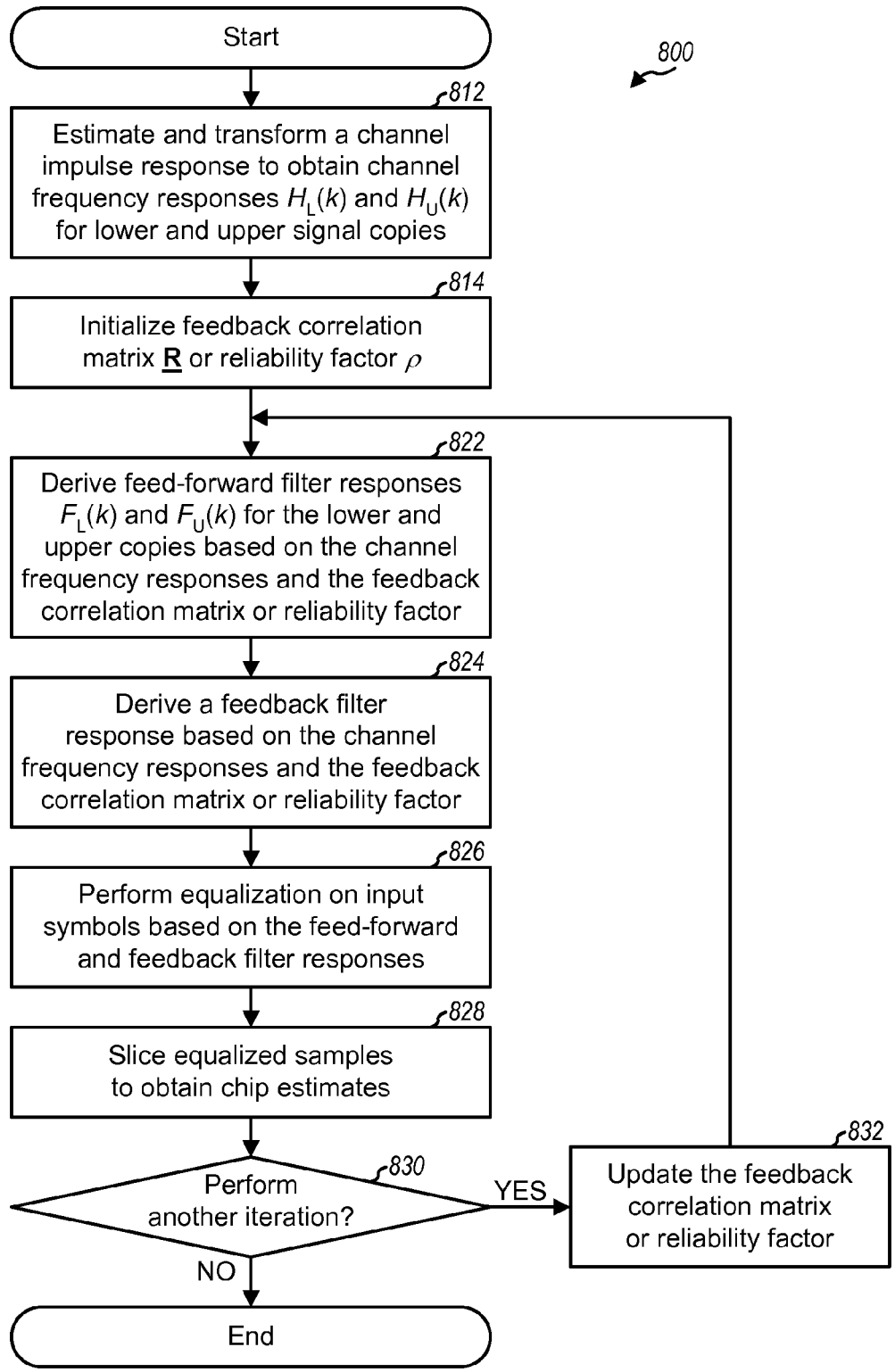
FIG. 8 shows a process to derive feed-forward and feedback filter responses.

FIG. 8 shows an embodiment of a process 800 for deriving fractionally-spaced feed-forward and feedback filter responses and equalizing the input symbols. Initially, a channel impulse response h(n) is estimated and transformed with an FFT/DFT to obtain channel frequency responses $H_L(k)$ and $H_U(k)$ for the lower and upper signal copies, respectively (block 812). A feedback correlation matrix R or a reliability factor ρ is initialized, e.g., to zero(s) for the first iteration (block 814).

Feed-forward filter responses $F_L(k)$ and $F_U(k)$ for the lower and upper copies are derived based on the channel frequency responses $H_L(k)$ and $H_U(k)$ and the feedback correlation R(k,k) or the reliability factor ρ, e.g., as shown in equation (33), (37), (38) or (42) (block 822). A feedback filter response B(k) is also derived based on the channel frequency responses $H_L(k)$ and $H_U(k)$ and the feedback correlation R(k,k) or the reliability factor ρ, e.g., as shown in equation (34), (35) and (36), (39), or (40) and (41) (block 824). Equalization is performed on the input symbols $R_L(k)$ and $R_U(k)$ for the lower and upper copies based on the feed-forward and feedback filter responses, e.g., as shown in equations (29) through (31) (block 826). The equalized symbols are transformed and sliced to obtain chip estimates ŝ(n) (block 828).

Equalization may be performed for one or multiple iterations. A determination is made whether to perform another iteration (block 830). If the answer is 'Yes', then the feedback correlation matrix R or the reliability factor ρ is updated (block 832). The process then returns to block 822 to update the feed-forward and feedback filter responses and to perform equalization with the updated filter responses. Otherwise, if all iterations are completed and the answer is 'No' for block 830, then the process terminates.

For clarity, the fractionally-spaced DFE has been described for 2× over-sampling at the receiver, or C=2, where C is the over-sampling ratio. In general, the fractionally-spaced DFE may be used with any amount of over-sampling. In the equations above, the term $(|H_L(k)|^2+|H_U(k)|^2)$ may be substituted with $(|H_1(k)|^2+ \ldots +|H_C(k)|^2)$, index c may run from 1 through C, and the factor of 2 may be substituted with C where appropriate.

For clarity, the chip-spaced DFE and fractionally-spaced DFE have been described for a single receive antenna at the receiver. The DFEs described herein may also be used for a receiver with multiple (R) antennas, which may be employed for receive diversity or a multiple-input multiple-output (MIMO) transmission. For chip rate sampling with receive diversity, the receiver obtains R signal copies and R channel frequency responses for the R receive antennas. The receiver may derive R feed-forward filter responses for the R signal copies, e.g., based on the description above for the fractionally-spaced DFE, albeit with the signal copies being from different receive antennas instead of different parts of the signal spectrum. For over-sampling with receive diversity, the receiver obtains R·C signal copies and R·C channel frequency responses for the R receive antennas and C times over-sampling. The receiver may derive R·C feed-forward filter responses for the R·C signal copies, e.g., based on the description above for the fractionally-spaced DFE, albeit with the signal copies being from different receive antennas as well as different parts of the signal spectrum.

Figure 9:
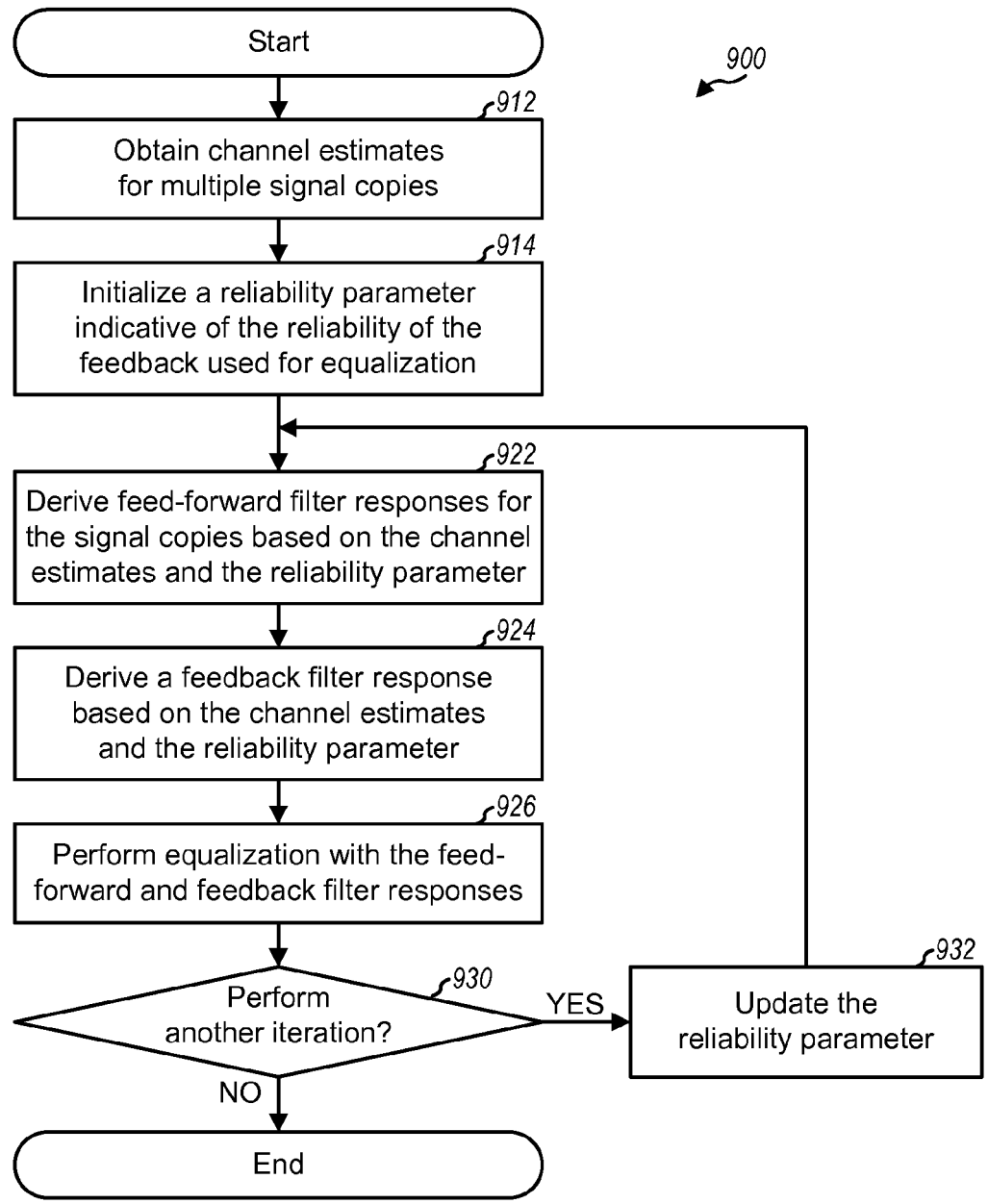
FIG. 9 shows a process to perform equalization for multiple signal copies.

FIG. 9 shows an embodiment of a process 900 for performing decision feedback equalization for multiple signal copies, which may be obtained via multiple receive antennas and/or over-sampling. Channel estimates are obtained for the multiple signal copies (block 912). The channel estimates may be channel impulse response estimates, channel frequency response estimates, and so on. A reliability parameter, which may be a feedback correlation matrix R, a reliability factor ρ, and/or some other quantity, is initialized (block 914).

Feed-forward filter responses for the multiple signal copies are derived based on the channel estimates and the reliability parameter (block 922). A feedback filter response is derived based on the channel estimates and the reliability parameter (block 924). The feed-forward and feedback filter responses may be derived (1) without any constraint on the feedback filter, (2) with a constraint of no feedback for an on-time sample, or (3) based on some other constraint or condition. The feed-forward and feedback filter responses may be derived based on MMSE or some other criterion. The feed-forward and feedback filter responses may be derived independently, the feedback filter response may be derived based on the feed-forward filter responses, or the feed-forward filter responses may be derived based on the feedback filter response. In general, different feed-forward and feedback filter responses may be derived for different filter constraints, assumptions on feedback reliability, design criteria, and so on.

Equalization is performed with the feed-forward and feedback filter responses (block 926). The equalization may be performed on a block-by-block basis for each received data block. Equalization may also be performed for multiple iterations. If another iteration is to be performed, as determined in block 930, then the reliability parameter may be updated in block 932, and the feed-forward and feedback filter responses for the next iteration may be derived based on the channel estimates and the updated reliability parameter.

3. Decision Feedback Reliability

The feed-forward and feedback filter responses may be derived based on R(k,k) or ρ, which is related to the reliability of the chip estimates s(n). The chip estimates are tentative decisions that are fed back for equalization. The amount of feedback is related to how reliable the chip estimates are statistically. The amount of feedback may be large if the chip estimates are very reliable and may be small if the chip estimates are not too reliable. In the extreme case, there may be no feedback if the chip estimates are completely unreliable.

The reliability of the chip estimates may be estimated in various manners. In an embodiment, the reliability is estimated based on correctly decoded blocks. An error detection code, such as a cyclic redundancy check (CRC) code, may be used to determine whether a given block is decoded correctly. The transmitter may generate a CRC for a data block and append the CRC as part of the data block. The receiver may use the appended CRC for error detection. After decoding the block, the receiver may generate a CRC based on the decoded block and may compare the generated CRC against the appended CRC. If the two CRCs match, then the block is deemed to have been decoded correctly, and all of the chips in that block become known to the receiver.

The receiver may use a correctly decoded block to compute the reliability of the chip estimates at various stages or iterations of equalization. The receiver may process the decoded block in the same manner performed by the transmitter and regenerate the transmit chips s(n) sent by the transmitter for the data block. In an embodiment, the receiver may correlate the transmit chips s(n) with the chip estimates $\hat{s}_i(n)$ for a given stage i to obtain a reliability factor $\rho_i$ for that stage, as follows:

$$\rho_i = \frac{1}{E_s \cdot K} \cdot \left| \sum_{k=1}^{K} s(n) \cdot \hat{s}_i^*(n) \right|. \quad \text{Eq (43)}$$

In another embodiment, the receiver may derive a feedback correlation matrix $\underline{R}_i$ for stage i, as follows:

$$\underline{R}_i = \frac{1}{E_s} \cdot s \cdot \hat{s}_i^H, \quad \text{Eq (44)}$$

where $\hat{s}_i$ is a K×1 vector of symbol estimates for stage i.

Different chip estimates are obtained and fed back for equalization in different stages. Hence, the receiver may estimate the feedback reliability for different stages based on the chip estimates for these stages.

The reliability of the decision feedback may be filtered across multiple correctly decoded blocks to reduce variation. The filtering may be performed based on a finite impulse response (FIR) filter, an infinite impulse response (IIR) filter, or some other type of filter. The time constant or bandwidth for the filter may be selected based on the expected rate of change in the channel conditions. A large time constant or small bandwidth may be used for a slowly varying channel. Conversely, a small time constant or large bandwidth may be used for a fast changing channel. The time constant of the filter may be adaptive based on Doppler for the receiver.

Adjacent data blocks may be assumed to have appropriately similar decision feedback reliability for the same stage of equalization. In this case, the reliability estimated for different stages based on correctly decoded blocks may be used for decision-feedback equalization of future blocks.

The reliability of the decision feedback may be dependent on the modulation scheme used by the transmitter. In an embodiment, feedback reliability is estimated and maintained for different modulation schemes. For this embodiment, the reliability estimated for correctly decoded blocks sent with a given modulation scheme is used for equalization of future blocks sent with the same modulation scheme. In another embodiment, the feedback reliability is estimated in a manner to account for different modulation schemes used for the correctly decoded blocks.

The reliability of the decision feedback may also be estimated based on other transmissions that are known a priori or ascertained by the receiver. For example, if a data block includes a known portion (e.g., a unique word, a preamble, and/or some other known information), then the feedback reliability may be estimated based on this known portion.

The receiver may use the estimated feedback reliability to derive the feed-forward and feedback filter responses. The receiver may also use the feedback reliability to determine whether to perform decision feedback equalization or linear equalization (without decision feedback). For example, the receiver may perform linear equalization if the feedback is too unreliable.

Figure 10:
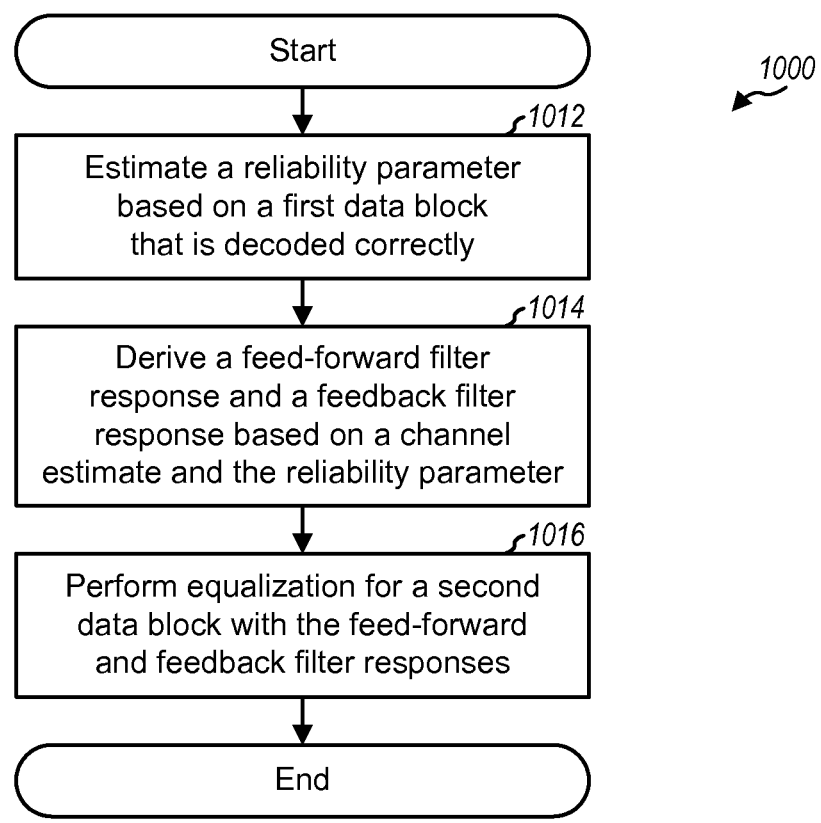
FIG. 10 shows a process to perform decision feedback equalization based on a reliability parameter derived from correctly decoded data blocks.

FIG. 10 shows an embodiment of a process 1000 for performing decision feedback equalization based on a reliability parameter derived from correctly decoded blocks. The reliability parameter is estimated based on a first data block that is decoded correctly, which may be determined based on a CRC or some other error detection code (block 1012). The reliability parameter may be estimated based on (1) correlation of the transmit chips with the chip estimates, e.g., as shown in equation (43), or (2) an outer product of the transmit symbols and the symbol estimates, e.g., as shown in equation (44). The reliability parameter may be filtered across multiple correctly decoded blocks. The time constant for the filtering may be selected based on channel conditions and/or other factors.

A feed-forward filter response and a feedback filter response are derived based on a channel estimate and the reliability parameter (block 1014). Equalization is performed for a second data block with the feed-forward and feedback filter responses (block 1016). If equalization is performed in multiple iterations or stages, then the reliability parameter may be estimated for each stage based on the first data block and the chip or symbol estimates for that stage. The feed-forward and feedback filter responses for each iteration may be derived based on the reliability parameter for that iteration.

Figure 11:
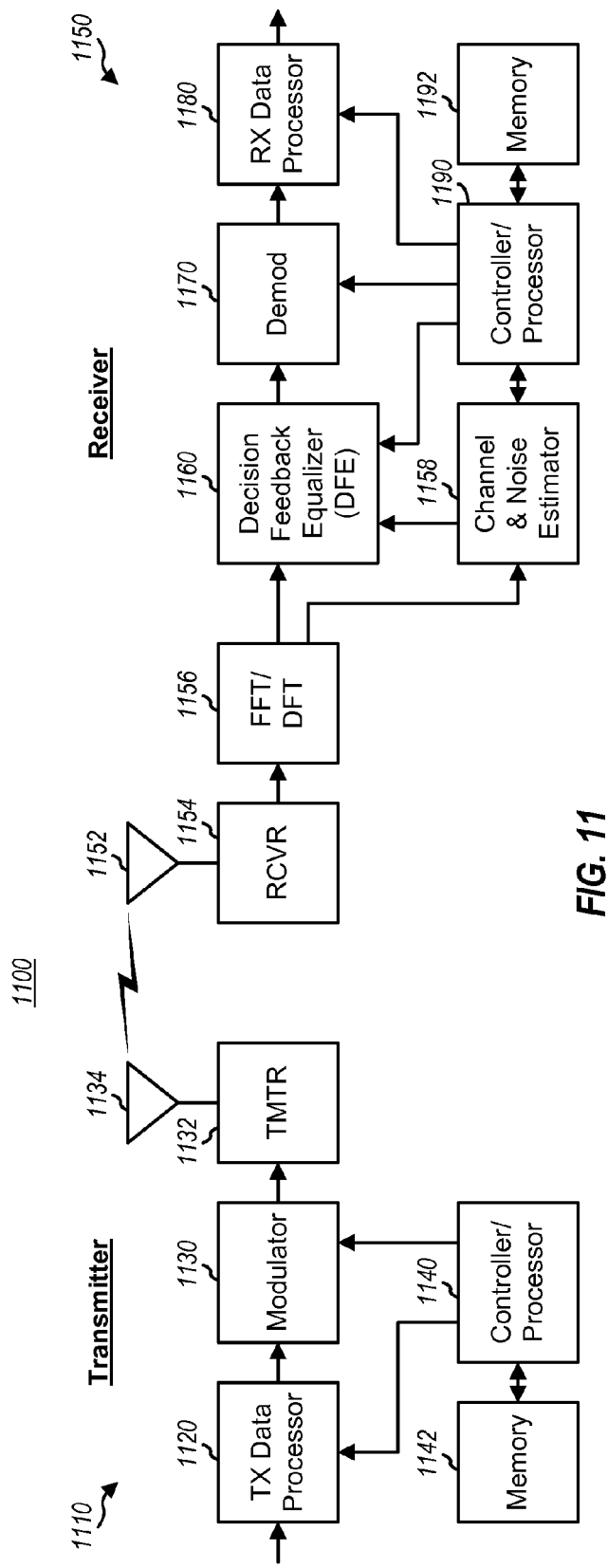
FIG. 11 shows a block diagram of a transmitter and a receiver.

FIG. 11 shows a block diagram of an embodiment of a transmitter 1110 and a receiver 1150 in a communication system 1100. For a downlink/forward link transmission, transmitter 1110 is part of a base station, and receiver 1150 is part of a wireless device. For an uplink/reverse link transmission, transmitter 1110 is part of a wireless device, and receiver 1150 is part of a base station. A base station is typically a fixed station that communicates with the wireless devices and may also be called a Node B, an access point, and so on. A wireless device may be fixed or mobile and may also be called a user equipment (UE), a mobile station, a user terminal, a subscriber unit, and so on. A wireless device may be a cellular phone, a personal digital assistant (PDA), a wireless modem card, or some other device or apparatus.

At transmitter 1110, a transmit (TX) data processor 1120 processes (e.g., encodes, interleaves, and symbol maps) traffic data and generates data symbols. As used herein, a data symbol is a modulation symbol for data, a pilot symbol is a modulation symbol for pilot, a modulation symbol is a complex value for a point in a signal constellation (e.g., for M-PSK or M-QAM), and pilot is data that is known a priori by both the transmitter and receiver. A modulator 1130 process the data symbols and pilot symbols in a manner specified by the system and provides transmit chips s(n) to a transmitter unit (TMTR) 1132. Transmitter unit 1132 processes (e.g., converts to analog, amplifies, filters, and frequency upconverts) the transmit chips and generates an RF signal, which is transmitted from an antenna 1134.

At receiver 1150, an antenna 1152 receives the transmitted RF signal via various signal paths and provides a received signal to a receiver unit (RCVR) 1154. Receiver unit 1154 conditions (e.g., filters, amplifies, and frequency downconverts) the received signal, digitizes the conditioned signal at a sample rate that may be equal to or higher than the chip rate, and provides time-domain input samples. An FFT/DFT unit 1156 transforms the input samples to the frequency domain and provides frequency-domain input symbols.

A channel and noise estimator 1158 estimates the channel response and the noise based on the frequency-domain input symbols and/or the time-domain input samples. A decision feedback equalizer (DFE) 1160 derives the feed-forward filter response(s) and the feedback filter response based on the channel and noise estimates and a reliability parameter. The reliability parameter may be estimated and updated by DFE 1160, a controller 1190, or some other unit based on correctly decoded blocks and/or other known transmissions.

DFE 1160 filters the input symbols based on the feed-forward and feedback filter responses and provides chip estimates to a demodulator (Demod) 1170. DFE 1160 may implement any of the DFE designs described above. Demodulator 1170 processes the chip estimates in a manner complementary to the processing by modulator 1130 and provides data symbol estimates. A receive (RX) data processor 1180 processes (e.g., symbol demaps, deinterleaves, and decodes) the data symbol estimates and provides decoded data. RX data processor 1180 may also check each data block based on the CRC. In general, the processing by demodulator 1170 and RX data processor 1180 is complementary to the processing by modulator 1130 and TX data processor 1120, respectively, at transmitter 1110.

Controllers/processors 1140 and 1190 direct operation of various processing units at transmitter 1110 and receiver 1150, respectively. Memories 1142 and 1192 store data and program codes for transmitter 1110 and receiver 1150, respectively.

The equalization techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and so on. A CDMA system may implement one or more radio technologies such as Wideband-CDMA (W-CDMA), cdma2000, and so on. cdma2000 covers IS-2000, IS-856, and IS-95 standards. A TDMA system may implement a radio technology such as Global System for Mobile Communications (GSM). These various radio technologies and standards are known in the art. An OFDMA system transmits modulation symbols in the frequency domain on orthogonal subcarriers using orthogonal frequency division multiplexing (OFDM). An SC-FDMA system transmits modulation symbols in the time domain on orthogonal subcarriers.

Modulator 1130 at transmitter 1110 and demodulator 1170 at receiver 1150 perform processing as specified by the system. For example, modulator 1130 may perform processing for CDMA, OFDM, SC-FDMA, and so on, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method comprising:
   deriving (424, 524), in frequency domain, a feed-forward filter response and a feedback filter response based on a channel estimate and a reliability parameter wherein the step of deriving comprises:
   in an initial iteration, initializing a feedback correlation matrix or a reliability factor to zero(s); and
   performing (426, 526) equalization with the feed-forward and feedback filter responses.

2. The method of claim 1, further comprising:
   estimating (1012) the reliability parameter based on a data block that is decoded correctly.

3. The method of claim 1, wherein equalization is performed for multiple iterations, and wherein the deriving the feed-forward and feedback filter responses comprises
updating (432, 532) the reliability parameter for each iteration, and
deriving the feed-forward and feedback filter responses for each iteration based on the channel estimate and the reliability parameter for the iteration.

4. A method of claim 1 comprising:
deriving (822, 922) multiple feed-forward filter responses for multiple signal copies based on channel estimates for the multiple signal copies and a reliability parameter;
deriving (824, 924) a feedback filter response based on the channel estimates and the reliability parameter; and
performing (826, 926) equalization on input symbols for the multiple signal copies with the multiple feed-forward filter responses and the feedback filter response.

5. The method of claim 4, wherein the deriving the multiple feed-forward filter responses comprises deriving the multiple feed-forward filter responses without constraint on the feedback filter response, and wherein the deriving the feedback filter response comprises deriving the feedback filter response without constraint on the feedback filter response.

6. The method of claim 4, wherein the deriving the multiple feed-forward filter responses comprises deriving the multiple feed-forward filter responses with a constraint of no feedback for an on-time sample, and wherein the deriving the feedback filter response comprises deriving the feedback filter response with the constraint of no feedback for the on-time sample.

7. A method of claim 1 comprising:
estimating (1012) a reliability parameter based on a first data block that is decoded correctly;
deriving (1014) a feed-forward filter response and a feedback filter response based on a channel estimate and the reliability parameter; and
performing equalization (1016) for a second data block with the feed-forward and feedback filter responses.

8. The method of claim 7, wherein the estimating the reliability parameter comprises
generating transmit chips based on the first data block, and estimating the reliability parameter based on correlation between the transmit chips and chip estimates from the equalization.

9. The method of claim 7, wherein the estimating the reliability parameter comprises estimating the reliability parameter for each of multiple iterations of equalization based on the first data block, wherein the deriving the feed-forward and feedback filter responses comprises deriving the feed-forward and feedback filter responses for each iteration based on the reliability parameter for the iteration, and wherein the performing equalization comprises performing each iteration of equalization for the second data block with the feed-forward and feedback filter responses for the iteration.

10. The method of claim 1, wherein the step of deriving further comprises in a subsequent iteration, constraining the feedback filter response to no feedback for an on-time sample.

11. An apparatus comprising:
means for deriving (422, 522), in frequency domain, a feed-forward filter response and a feedback filter response based on a channel estimate and a reliability parameter,
means for initializing, in an initial iteration, a feedback correlation matrix or a reliability factor to zero(s); and
means for performing (426, 526) equalization with the feed-forward and feedback filter responses.

12. The apparatus of claim 11, further comprising: means for estimating (1012) the reliability parameter based on a data block that is decoded correctly.

13. The apparatus of claim 11, wherein equalization is performed for multiple iterations, and wherein the means for deriving the feed-forward and feedback filter responses comprises
means for updating (432, 532) the reliability parameter for each iteration, and
means for deriving the feed-forward and feedback filter responses for each iteration based on the channel estimate and the reliability parameter for the iteration.

14. The apparatus of claim 11 further comprises means for providing feedback, in a subsequent iteration with a constraint of no feedback for an on-time sample.

15. An apparatus of claim 11 comprising:
at least one processor to derive (822, 922) multiple feed-forward filter responses for multiple signal copies based on channel estimates for the multiple signal copies and a reliability parameter, to derive (824, 924) a feedback filter response based on the channel estimates and the reliability parameter, and to perform equalization on input symbols for the multiple signal copies with the multiple feed-forward filter responses and the feedback filter response; and
a memory coupled to the at least one processor.

16. The apparatus of claim 14, wherein the at least one processor is operable to derive the feed-forward and feedback filter responses without constraint on the feedback filter response.

17. The apparatus of claim 14, wherein the at least one processor is derives the feed-forward and feedback filter responses with a constraint of no feedback for an on-time sample.

18. The apparatus of claim 14, wherein the at least one processor is operable to obtain the multiple signal copies via over-sampling of a received signal.

19. The apparatus of claim 14, wherein the at least one processor is operable to obtain the multiple signal copies via multiple receive antennas.

20. The apparatus of claim 14, wherein the at least one processor is operable to obtain the multiple signal copies via multiple receive antennas and over-sampling of a received signal from each receive antenna.

21. An apparatus of claim 11 comprising:
means for deriving (822, 922) multiple feed-forward filter responses for multiple signal copies based on channel estimates for the multiple signal copies and a reliability parameter;
means for deriving (824, 924) a feedback filter response based on the channel estimates and the reliability parameter; and
means for performing (826, 926) equalization on input symbols for the multiple signal copies with the multiple feed-forward filter responses and the feedback filter response.

22. The apparatus of claim 21, wherein the means for deriving the multiple feed-forward filter responses comprises means for deriving the multiple feed-forward filter responses without constraint on the feedback filter response, and wherein the means for deriving the feedback filter response comprises means for deriving the feedback filter response without constraint on the feedback filter response.

23. The apparatus of claim 21, wherein the means for deriving the multiple feed-forward filter responses comprises means for deriving the multiple feed-forward filter responses with a constraint of no feedback for an on-time sample, and wherein the means for deriving the feedback filter response comprises means for deriving the feedback filter response with the constraint of no feedback for the on-time sample.

24. An apparatus of claim 11 comprising:
- at least one processor to estimate (1012) a reliability parameter based on a first data block that is decoded correctly, to derive (1014) a feed-forward filter response and a feedback filter response based on a channel estimate and the reliability parameter, and to perform equalization (1016) for a second data block with the feed-forward and feedback filter responses; and
- a memory operatively coupled to the at least one processor.

25. The apparatus of claim 24, wherein the at least one processor is operable to determine that the first data block is decoded correctly based on a cyclic redundancy check (CRC).

26. The apparatus of claim 24, wherein the at least one processor is operable to generate transmit chips based on the first data block and estimates the reliability parameter based on correlation between the transmit chips and chip estimates from the equalization.

27. The apparatus of claim 24, wherein the at least one processor is operable to generate transmit symbols based on the first data block and estimates the reliability parameter based on an outer product of the transmit symbols and symbol estimates from the equalization.

28. The apparatus of claim 24, wherein the at least one processor is operable to estimate the reliability parameter for each of multiple iterations of equalization based on the first data block, derives the feed-forward and feedback filter responses for each iteration based on the reliability parameter for the iteration, and performs each iteration of equalization for the second data block with the feed-forward and feedback filter responses for the iteration.

29. The apparatus of claim 24, wherein the at least one processor is operable to filter the reliability parameter across multiple correctly decoded data blocks.

30. The apparatus of claim 24, wherein the at least one processor is operable to select a time constant based on channel conditions and filters the reliability parameter across multiple correctly decoded data blocks in accordance with the selected time constant.

31. The apparatus of claim 24, wherein the at least one processor is operable to determine whether or not to derive and use the feedback filter response based on the reliability parameter.

32. An apparatus of claim 24 comprising:
- means for estimating (1012) a reliability parameter based on a first data block that is decoded correctly;
- means for deriving (1014) a feed-forward filter response and a feedback filter response based on a channel estimate and the reliability parameter; and
- means for performing equalization (1016) for a second data block with the feed-forward and feedback filter responses.

33. The apparatus of claim 32, wherein the means for estimating the reliability parameter comprises
- means for generating transmit chips based on the first data block, and
means for estimating the reliability parameter based on correlation between the transmit chips and chip estimates from the equalization.

34. The apparatus of claim 32, wherein the means for estimating the reliability parameter comprises means for estimating the reliability parameter for each of multiple iterations of equalization based on the first data block, wherein the means for deriving the feed-forward and feedback filter responses comprises means for deriving the feed-forward and feedback filter responses for each iteration based on the reliability parameter for the iteration, and wherein the means for performing equalization comprises means for performing each iteration of equalization for the second data block with the feed-forward and feedback filter responses for the iteration.

35. The apparatus of claim 11, wherein the reliability parameter is a function of frequency.

36. The apparatus of claim 11, wherein the reliability parameter is frequency invariant.

* * * * *